United States Patent
Nakasone et al.

(10) Patent No.: US 9,891,139 B2
(45) Date of Patent: *Feb. 13, 2018

(54) CATALYST DETERIORATION DIAGNOSIS SYSTEM AND CATALYST DETERIORATION DIAGNOSIS METHOD

(71) Applicant: NGK INSULATORS, LTD., Nagoya-shi, Aichi (JP)

(72) Inventors: Osamu Nakasone, Inabe (JP); Noriko Hirata, Nagoya (JP); Yuki Nakayama, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 25 days.

This patent is subject to a terminal disclaimer.

(21) Appl. No.: 14/953,592

(22) Filed: Nov. 30, 2015

(65) Prior Publication Data
US 2016/0161370 A1 Jun. 9, 2016

(30) Foreign Application Priority Data
Dec. 3, 2014 (JP) .................. 2014-244995

(51) Int. Cl.
*G01M 15/10* (2006.01)
*F01N 3/10* (2006.01)
(Continued)

(52) U.S. Cl.
CPC .......... *G01M 15/102* (2013.01); *F01N 3/103* (2013.01); *F01N 3/106* (2013.01); *F01N 11/00* (2013.01);
(Continued)

(58) Field of Classification Search
CPC ................................ G01M 15/102
See application file for complete search history.

(56) References Cited

U.S. PATENT DOCUMENTS 5,296,196 A 3/1994 Takeshima
6,079,203 A 6/2000 Wakamoto
(Continued)

FOREIGN PATENT DOCUMENTS

DE 102005049775 A1 4/2007
EP 1154131 B1 2/2005
(Continued)

OTHER PUBLICATIONS

The Extended European Search Report for the corresponding European patent application No. 15197487.0 dated Mar. 16, 2016.

*Primary Examiner* — Clayton E Laballe
*Assistant Examiner* — Dennis Hancock
(74) *Attorney, Agent, or Firm* — Global IP Counselors, LLP

(57) ABSTRACT

A system for diagnosing the degree of deterioration of a catalyst disposed in an exhaust path of an internal combustion engine and oxidizes or adsorbs a target gas in an exhaust gas, includes a temperature sensor measuring a temperature of the exhaust gas at the upstream from a catalyst in an exhaust path and a gas sensor detecting a target gas at the downstream of the exhaust path and outputting an output value in accordance with a concentration of the target gas, wherein a control element is configured to diagnose the degree of deterioration in the catalyst, based on at least the output value in the gas sensor, the temperature of the catalyst identified based on a measurement value in the temperature sensor, and the threshold value at the temperature of the catalyst.

11 Claims, 16 Drawing Sheets

(51) Int. Cl.
  *F02D 41/02* (2006.01)
  *F01N 11/00* (2006.01)
  *F02D 41/14* (2006.01)

(52) U.S. Cl.
  CPC ..... *F02D 41/0235* (2013.01); *F02D 41/1446* (2013.01); *F02D 41/1459* (2013.01); *F01N 2550/02* (2013.01); *F01N 2560/023* (2013.01); *F01N 2560/06* (2013.01); *F01N 2900/1402* (2013.01); *F01N 2900/1404* (2013.01); *F01N 2900/1621* (2013.01); *Y02T 10/47* (2013.01)

(56) References Cited

U.S. PATENT DOCUMENTS

| | | | |
|---|---|---|---|
| 6,303,012 B1 * | 10/2001 | Inoue | G01N 27/417 204/425 |
| 6,401,453 B1 | 6/2002 | Lemire | |
| 2003/0093989 A1 | 5/2003 | Ueno et al. | |
| 2009/0114539 A1 | 5/2009 | Ziegler et al. | |
| 2010/0083635 A1 | 4/2010 | Kitaura et al. | |
| 2013/0283767 A1 | 10/2013 | Jackson et al. | |
| 2014/0065041 A1 | 3/2014 | Szailer et al. | |

FOREIGN PATENT DOCUMENTS

| | | |
|---|---|---|
| FR | 2972222 A1 | 9/2012 |
| FR | 2993315 A1 | 1/2014 |
| JP | 7-103039 A | 4/1995 |
| JP | 2876793 B2 | 1/1999 |
| JP | 2001-263048 A | 9/2001 |
| JP | 2005-240716 A | 9/2005 |
| JP | 2012-36860 | 2/2012 |
| JP | 2012-241594 A | 12/2012 |

* cited by examiner

F I G. 1
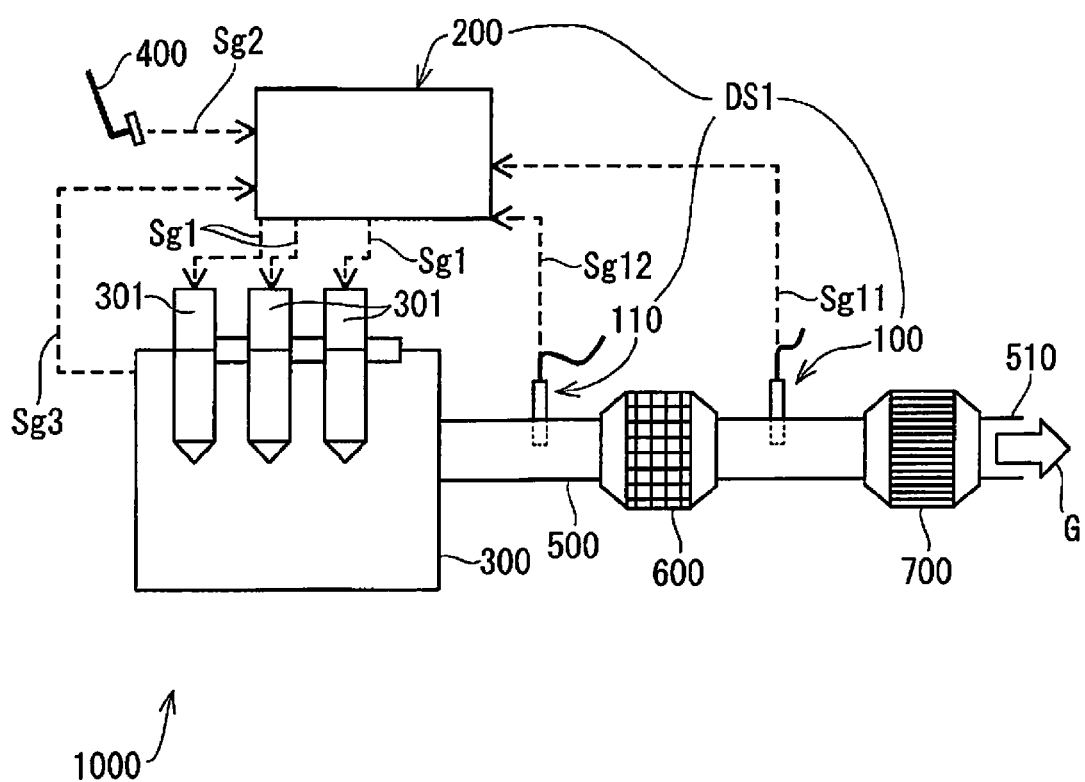

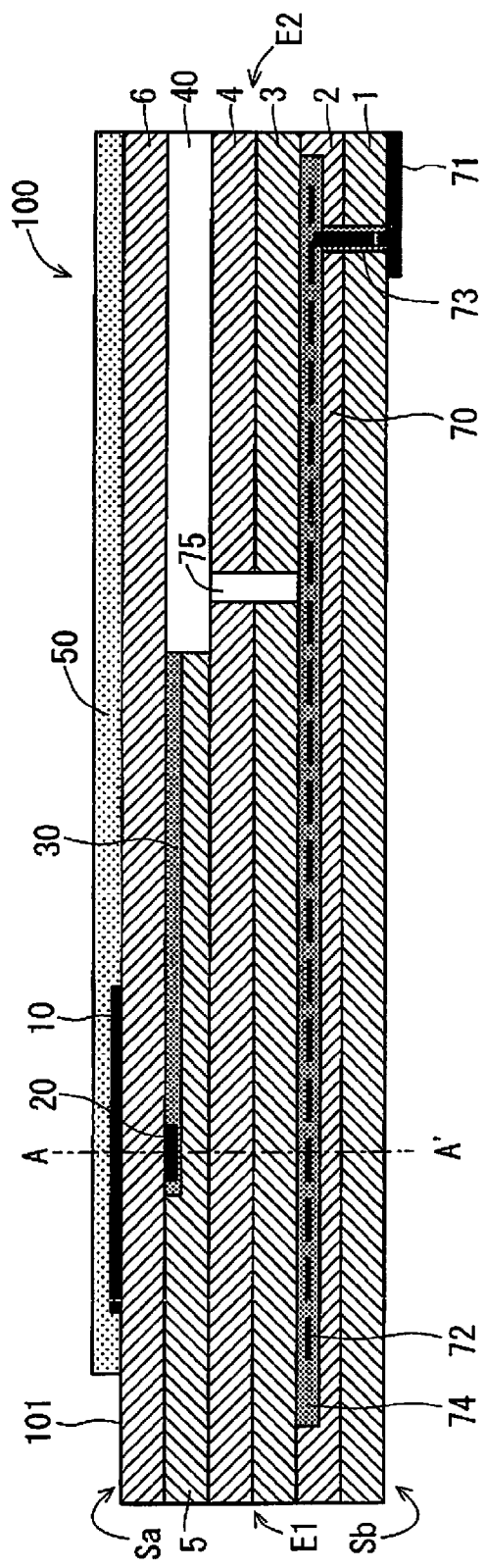
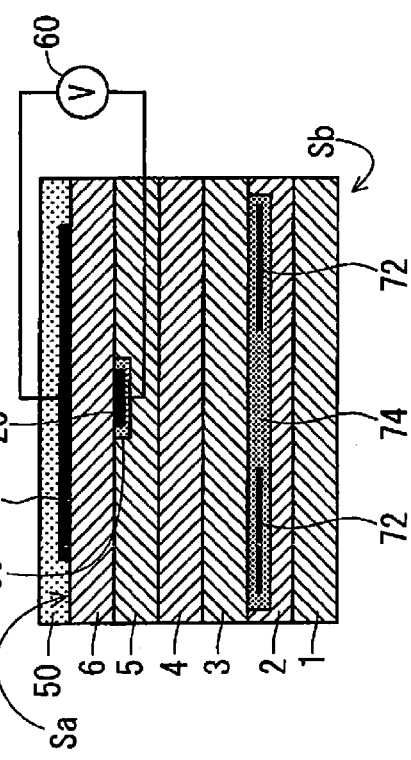
FIG. 2A
FIG. 2B

CATALYST DETERIORATION DIAGNOSIS SYSTEM AND CATALYST DETERIORATION DIAGNOSIS METHOD

BACKGROUND OF THE INVENTION

Field of the Invention

The present invention relates to a system for diagnosing the degree of deterioration of a catalyst oxidizing or adsorbing an unburned hydrocarbon gas.

Description of the Background Art

Conventionally, concerning OBD (function diagnosis) of an exhaust gas purification system for automobile, that is, a function of determining whether a catalyst works normally or not in the system, many patent applications are filed centered of automotive companies; however, most of them are techniques using an exhaust gas temperature sensor, an oxygen sensor, a wide range oxygen concentration sensor ($\lambda$ sensor), a NOx sensor, and a PM sensor, and a diagnosis target is a three-way catalyst, an oxidation catalyst, a NOx storage catalyst, a NOx selective reduction catalyst, and a diesel particulate filter (DPF) (e.g., Japanese Patent Application Laid-Open No. 2001-263048, Japanese Patent Application Laid-Open No. 2005-240716, Japanese Patent Application Laid-Open No. 2012-036860, Japanese Patent Application Laid-Open No. 2012-241594, and Japanese Patent Application Laid-Open No. 07-103039 (1995)).

On the other hand, as a hydrocarbon gas sensor (HC sensor) for automobile exhaust gas measurement, sensors of various principles and various types are researched and developed. For example, a semiconductor type HC sensor which is applicable for purification control of NOx in a zeolite catalyst and can selectively detect HC (hydrocarbon) having a large molecular weight, is already publicly known (e.g., refer to Japanese Patent No. 2876793). As other HC sensors, sensors of a catalytic-combustion type, an oxygen-concentration difference detection type, a limiting current type, a mixed-potential type and the like are widely known, and a large number of patent applications have been filed at the peak of around year 2000.

It is supposed that these HC sensors are mainly used for purification performance inspection of exhaust gas purification devices (TWC: three-way catalyst, NSC: NOx storage catalyst) to be mounted on a gasoline engine of theoretical equivalent ratio (air excess ratio $\lambda=1$) combustion or lean burn (lean burn type, $\lambda>1$), or the control of injection amount of unburned hydrocarbon in a diesel engine.

Entering the 2010s, exhaust gas regulations are enhanced in North America, and among others, OBD of an oxidation catalyst to diesel engine vehicles will be obliged in the future. Specifically, the need for performing OBD targeted at NMHC (Non Methane HydroCarbon) in $O_2$(oxygen)-excess atmosphere which is an exhaust gas atmosphere of the diesel engine against an oxidation catalyst for a diesel engine, has arisen.

However, there is a problem that as disclosed in Japanese Patent Application Laid-Open No. 2001-263048, Japanese Patent Application Laid-Open No. 2005-240716, Japanese Patent Application Laid-Open No. 2012-036860, Japanese Patent Application Laid-Open No. 2012-241594 and Japanese Patent Application Laid-Open No. 07-103039 (1995), a techniques using publicly known sensor cannot respond to such OBD or can only indirectly diagnose.

For example, Japanese Patent Application Laid-Open No. 2001-263048 discloses a technique of using a relation that when the capability to convert (oxidize or combust) unburned hydrocarbon in an oxidation catalyst is deteriorated, heat generation energy is also lowered. Schematically describing, in this technique, a temperature difference $\Delta T$ generated at the time of fuel injection in exhaust gas temperature sensors arranged upstream and downstream of an oxidation catalyst in an exhaust path is measured, and from the measured values, a degree of deterioration of capability to convert (oxidize or combust) unburned hydrocarbon in the oxidation catalyst is indirectly diagnosed.

However, in such a method, there is a problem that error cause due to changes in an exhaust gas temperature and exhaust gas flow rate in actual use is too large, and a problem that a fuel injection amount for accelerating heat generation is large and therefore deterioration of fuel economy cannot be avoided.

Further, Japanese Patent Application Laid-Open No. 2005-240716 discloses a technique of using the fact that when the capability to convert unburned hydrocarbon in an oxidation catalyst is deteriorated, consumption of oxygen during oxidative combustion is changed. Schematically describing, this is a technique in which a degree of deterioration of capability to convert unburned hydrocarbon in the oxidation catalyst is indirectly diagnosed, based on a difference $\Delta\lambda$ between output values $\lambda F$ and $\Delta R$ of two wide-range oxygen concentration sensors ($\lambda$ sensor) arranged upstream and downstream of an oxidation catalyst in an exhaust path, or from a change in value of oxygen consumption in the oxidation catalyst measured based on a difference between output values (electromotive force values) of two oxygen sensors.

However, the oxygen concentration in the diesel exhaust gas being an $O_2$-excessive atmosphere is about 10% (=100000 ppm), whereas an amount (concentration) of hydrocarbon which the oxidation catalyst converts (oxidizes or combusts) is usually about several hundreds ppm, and an amount (concentration) of oxygen to be consumed in burning such a slight amount of hydrocarbon is also only about several hundreds ppm at most. That is, this means that in order to diagnose the deterioration of an oxidation catalyst by use of the air-fuel ratio sensor or the oxygen sensor, it is necessary to calculate, with accuracy, $\Delta\lambda$ or a difference in electromotive force which corresponds to a change in an oxygen consumption of ppm order, but measurement accuracy of such an extent cannot be attained in the first place in the air-fuel ratio sensor and the oxygen sensor.

Japanese Patent Application Laid-Open No. 2012-036860 discloses a technique of determining a deterioration degree of an oxidation catalyst, which oxidizes NO to $NO_2$, based on an output value (electromotive force value) of a NOx sensor arranged downstream of the oxidation catalyst in an exhaust path, and a map previously defined.

However, even though capability to oxidize NO of the oxidation catalyst can be diagnosed by such a technique, the result of such diagnosis cannot be applied to the diagnosis of the capability to convert (oxidize or combust) unburned hydrocarbon. The reason for this is that since functions of a noble metal catalyst and a storage material vary with various gases (for example, HC, CO, NO, etc.), a relation between the exhaust gas temperature and the conversion rate (oxidizing capability) in each gas varies and there is not a definite correlation between them.

In addition, an estimated value is used for NOx value in the exhaust gas immediately after discharge from engine, and factors other than an engine speed and an engine load are not considered in setting such an estimated value, and therefore estimation accuracy may be significantly lowered depending on usage conditions.

Further, Japanese Patent Application Laid-Open No. 2012-241594 discloses a method in which an exhaust gas temperature sensor and a λ sensor are arranged upstream and downstream of an oxidation catalyst, and a deterioration degree of the oxidation catalyst is diagnosed based on a required oxygen amount obtained from an estimated value of HC storage amount at the time of normal state of the oxidation catalyst, and an estimated value of an actual oxygen consumption being an oxygen amount actually consumed by the oxidation catalyst which is computed based on an output value of the sensor.

However, in such a method, the diagnosis is only performed based on estimated values, and there is a problem that an influence of error of a signal from each sensor cannot be avoided and the diagnosis accuracy is low.

Further, Japanese Patent Application Laid-Open No. 07-103039 (1995) discloses an engine system whose target is TWC or NSC of a gasoline engine. Japanese Patent Application Laid-Open No. 07-103039 (1995) does not disclose diagnosis of an oxidation catalyst in the diesel exhaust gas in an $O_2$-excessive state at all.

SUMMARY OF THE INVENTION

The present invention relates to a system for diagnosing a degree of deterioration of a catalyst oxidizing or adsorbing an unburned hydrocarbon gas.

In accordance with the present invention, a catalyst is disposed in an exhaust path of an internal combustion engine and oxidizes or adsorbs a target gas, including at least one of a hydrocarbon gas and a carbon monoxide gas, contained in an exhaust gas from the internal combustion engine, and a catalyst deterioration diagnosis system for diagnosing the degree of deterioration of the catalyst comprises: a temperature sensor disposed upstream from the catalyst in the exhaust path and measuring a temperature of the exhaust gas containing the target gas at the upstream side; a first gas sensor disposed downstream from the catalyst in the exhaust path, detecting the target gas at the downstream and outputting an output value in accordance with a concentration of the target gas; a control element for controlling the catalyst deterioration diagnosis system; and a storage part, wherein threshold data describing threshold values to be used for the catalyst deterioration diagnosis according to a temperature of the catalyst is previously defined and stored in the storage part, and the control element is configured to diagnose the degree of deterioration in the catalyst, based on at least the output value in the first gas sensor, the temperature of the catalyst identified based on a measurement value in the temperature sensor, and the threshold value at the temperature of the catalyst which is described in the threshold data.

In accordance with another aspect of the present invention, a catalyst is disposed in an exhaust path of an internal combustion engine and oxidizes or adsorbs a target gas including at least one of a hydrocarbon gas and a carbon monoxide gas, contained in an exhaust gas from the internal combustion engine, and a method for diagnosing the degree of deterioration of the catalyst comprises the steps of: a) storing, in a predetermined storage part, threshold data previously defined, the threshold data describing threshold values to be used for the catalyst deterioration diagnosis according to a temperature of the catalyst; b) measuring a temperature of the exhaust gas containing the target gas by a temperature sensor at the upstream from the catalyst in the exhaust path; c) detecting the target gas by a first gas sensor at the downstream from the catalyst in the exhaust path, and outputting an output value in accordance with a concentration of the target gas; and d) diagnosing the degree of deterioration in the catalyst, based on at least the output values in the first gas sensor, the temperature of the catalyst identified based on a measurement value in the temperature sensor, and the threshold value at the temperature of the catalyst.

In accordance with the present invention, it is possible to diagnose, in real time and with excellent accuracy, the degree of deterioration of catalytic ability in an oxidation catalyst, which is disposed at a midpoint in the exhaust pipe from the engine main body being a diesel engine in an engine system, and oxidizes or adsorbs an unburned hydrocarbon gas in an exhaust gas. It is implemented based on the concentration of an unburned hydrocarbon gas at a downstream position close to the oxidation catalyst which is directly measured by a hydrocarbon gas sensor disposed at the position.

Accordingly, it is an object of the present invention to provide a method in which the degree of deterioration of an oxidation catalyst can be diagnosed with accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view schematically showing a schematic configuration of a diesel engine system 1000 configured to include an oxidation catalyst diagnosis system DS1 of a first preferred embodiment;

FIGS. 2A and 2B are each a schematic sectional view schematically showing an example of a configuration of a HC sensor 100;

DESCRIPTION OF THE PREFERRED EMBODIMENTS

Figure 3:
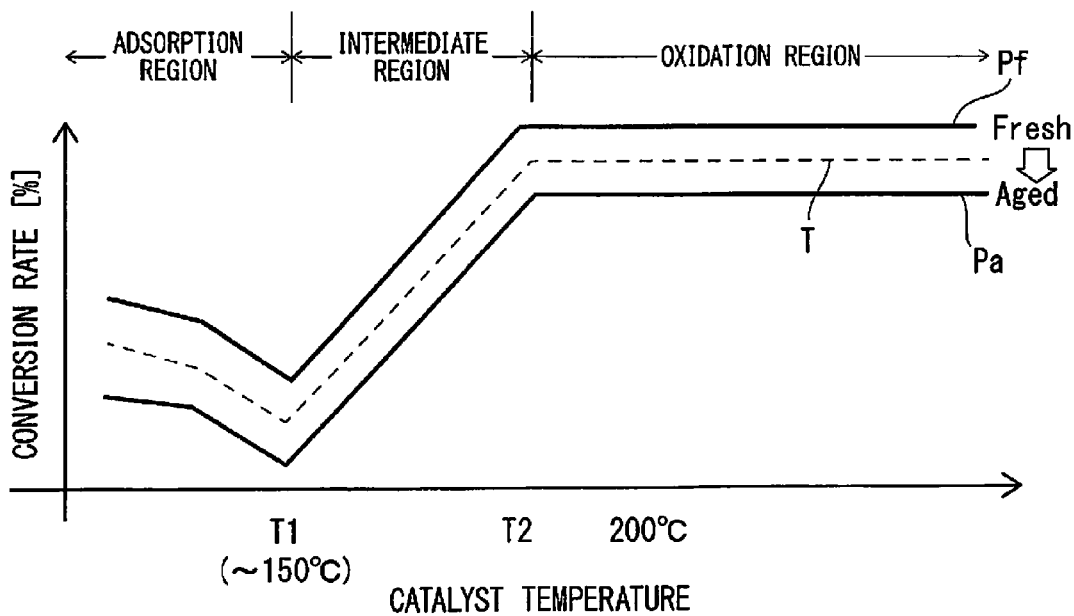
FIG. 3 is a view schematically showing a relation between a temperature and a conversion rate of an oxidation catalyst 600.

<First Preferred Embodiment>
<Overview of System>

FIG. 1 is a view schematically showing a schematic configuration of a diesel engine system (hereinafter, also referred to simply as an engine system) 1000 configured to include an oxidation catalyst diagnosis system DS1 of first preferred embodiment of the present invention.

The oxidation catalyst diagnosis system DS1 mainly comprises a hydrocarbon gas sensor (hereinafter, also referred to as a HC sensor) 100, a temperature sensor 110, and an electronic control device 200 being a control device which controls an operation of the whole engine system 1000.

The engine system 1000 mainly includes, in addition to the oxidation catalyst diagnosis system DS1, an engine main body 300 being a diesel engine as a type of internal combustion engine, a plurality of fuel injection valves 301 which inject fuel to the engine main body 300, a fuel-injection instructing part 400 for instructing the fuel injection valve 301 to inject fuel, an exhaust pipe 500 forming an exhaust path which discharges the exhaust gas (engine exhaust gas) G generated in the engine main body 300 to the outside, and an oxidation catalyst 600, such as platinum or palladium, which is disposed at a midpoint in the exhaust pipe 500, and oxidizes or adsorbs an unburned hydrocarbon gas in the exhaust gas G. In the preferred embodiment, in a relative sense, a position near the engine main body 300 in the exhaust pipe 500, which is one end side of the exhaust pipe 500, is referred to as an upstream side, and a position near an exhaust port 510 located on a side opposite to the engine main body 300 is referred to as a downstream side.

The engine system 1000 is typically mounted on an automobile, and in such a case, the fuel-injection instructing part 400 is an accelerator pedal.

In the engine system 1000, the electronic control device 200 is configured to send a fuel-injection instructing signal sg1 to the fuel injection valve 301. The fuel-injection instructing signal sg1 is usually sent according to a fuel-injection request signal sg2 which is given to the electronic control device 200 from the fuel-injection instructing part 400 during the operation (during the driving) of the engine system 1000, and requests injection of a predetermined amount of fuel (for example, the accelerator pedal is pressed down to request optimal fuel injection in consideration of many parameters such as an accelerator position, an intake oxygen amount, an engine speed and torque), and in addition to this, sometimes the fuel-injection instructing signal sg1 is sent for the operation of the oxidation catalyst diagnosis system DS1.

Further, a monitor signal sg3 which monitors various conditions within the engine main body 300 is given from the engine main body 300 to the electronic control device 200.

In the engine system 1000, the exhaust gas G from the engine main body 300 being a diesel engine is a gas of an $O_2$ (oxygen)-excessive atmosphere having an oxygen concentration of about 10%. Such an exhaust gas G specifically includes nitrogen oxides, soot (graphite) and the like in addition to oxygen and an unburned hydrocarbon gas. In the specification, examples of the unburned hydrocarbon gas, which is a gas (target gas) serving as a target of treatment of adsorption or oxidation in the oxidation catalyst 600, include carbon monoxide (CO) in addition to typical hydrocarbon gases (gases classified as hydrocarbon in terms of chemical formula) such as $C_2H_4$, $C_3H_6$, and n-C8. Further, the HC sensor 100 can suitably detect a target gas including CO. However, $CH_4$ is excluded from the target gas.

In addition, the engine system 1000 may include one or a plurality of other purification apparatuses 700 in the midpoint of the exhaust pipe 500 in addition to the oxidation catalyst 600.

A diagnosis target of the oxidation catalyst diagnosis system DS1 is the degree of deterioration of the oxidation catalyst 600 (more specifically, the degree of deterioration of catalytic ability of the oxidation catalyst 600). The oxidation catalyst 600 is disposed to suppress flow of an unburned hydrocarbon gas out of an exhaust outlet 510 at a tip of the exhaust pipe 500 by the adsorption or oxidation of the unburned hydrocarbon gas in the exhaust gas G flown from upstream; however, its catalytic ability (specifically adsorbing ability and oxidizing ability) is deteriorated with time. When such deterioration occurs, an amount of the unburned hydrocarbon gas, not captured in the oxidation catalyst 600 and flowing downstream, increases, and it is not preferred. The oxidation catalyst diagnosis system DS1 of the preferred embodiment is configured to diagnose the degree of deterioration of the oxidation catalyst 600 by detecting an unburned hydrocarbon gas passing through the oxidation catalyst 600 by the HC sensor 100.

The oxidation catalyst diagnosis system DS1, as described above, includes the HC sensor 100, and the temperature sensor 110, and the former is disposed on an downstream side of the oxidation catalyst 600 in the exhaust pipe 500, and detects a concentration of an unburned hydrocarbon gas at this location, and the latter is disposed on an upstream side of the oxidation catalyst 600 and detects a temperature of the exhaust gas G (exhaust gas temperature). Each of the HC sensor 100 and the temperature sensor 110 is disposed with its one end inserted into the exhaust pipe 500.

Schematically describing, in the oxidation catalyst diagnosis system DS1, the electronic control device 200 is configured to determine whether deterioration occurs in the oxidation catalyst 600 or not, based on a HC detection signal sg11 sent from the HC sensor 100 and an exhaust gas temperature detection signal sg12 sent from the temperature sensor 110. A configuration example of the HC sensor 100 and a detail of the deterioration diagnosis will be described later. On the other hand, as the temperature sensor 110, publicly known sensors may be used which are used for measurement of the exhaust gas temperature in common engine systems.

In addition, the electronic control device 200 has a storage portion, not shown, composed of, for example, memory and HDD, and this storage portion stores threshold data used in diagnosing the degree of deterioration of the oxidation catalyst 600 described later as well as programs controlling the operations of the engine system 1000 and the oxidation catalyst diagnosis system DS1.

<Configuration Example of HC Sensor>

FIGS. 2A and 2B are each a schematic cross-sectional view schematically showing an example of configuration of a HC sensor 100 to be used in the preferred embodiment. FIG. 2A is a vertical cross-sectional view of a sensor element 101 being a main component of the HC sensor 100, which is taken along the longitudinal direction of the sensor element 101. FIG. 2B is a view including a cross-section of the sensor element 101 perpendicular to the longitudinal direction taken along a position A-A' of FIG. 1A.

The HC sensor 100 used in the preferred embodiment is a so-called mixed-potential gas sensor. Schematically describing, using a potential difference that occurs between a sensing electrode 10, which is provided on the surface of the sensor element 101 mainly composed of ceramic being an oxygen-ion conductive solid electrolyte such as zirconia ($ZrO_2$), and a reference electrode 20, which is provided inside the sensor element 101, due to a difference in the concentration of a gas component being a measurement target between the portions near the electrodes on the basis of the principle of mixed potential, the HC gas sensor 100 determines the concentration of the gas component of a measurement gas.

In the presence of a plurality of unburned hydrocarbon gases in a measurement gas, a potential difference occurring between the sensing electrode 10 and the reference electrode 20 has a value reflecting all the plurality of unburned hydrocarbon gases, and thus, a concentration value to be determined is also a total sum of the concentrations of the plurality of unburned hydrocarbon gases.

The sensor element 101 mainly includes a reference gas introduction layer 30, a reference gas introduction space 40, and a surface protective layer 50 in addition to the sensing electrode 10 and the reference electrode 20.

In the preferred embodiment, the sensor element 101 has the structure in which six layers, namely, a first solid electrolyte layer 1, a second solid electrolyte layer 2, a third solid electrolyte layer 3, a fourth solid electrolyte layer 4, a fifth solid electrolyte layer 5, and a sixth solid electrolyte layer 6, each formed of an oxygen-ion conductive solid electrolyte, are laminated in the stated order from the bottom side of FIGS. 2A and 2B. The sensor element 101 additionally includes other components mainly between those layers or on an outer peripheral surface of the element. The solid electrolytes constituting those six layers are fully airtight. Such a sensor element 101 is manufactured by, for example, laminating ceramic green sheets corresponding to individual layers, which have been subjected to a predetermined process and printing of a circuit pattern, and further, by integrating the laminated layers through firing.

In the following description, for convenience' sake, in FIGS. 2A and 2B, the surface located as the upper surface of the sixth solid electrolyte layer 6 is referred to as a front surface Sa of the sensor element 101, and the surface located as the lower surface of the first solid electrolyte layer 1 is referred to as a rear surface Sb of the sensor element 101. In the determination of the concentration of an unburned hydrocarbon gas of a measurement gas with the HC sensor 100, a predetermined range starting from a distal end E1 being one end of the sensor element 101, which includes at least the sensing electrode 10, is disposed in a measurement gas atmosphere, and the other portion including a base end E2 being the other end is disposed so as not to be in contact with the measurement gas atmosphere.

The sensing electrode 10 is an electrode for sensing a measurement gas. The sensing electrode 10 is formed as a porous cermet electrode made of Pt containing a predetermined ratio of Au, namely, Pt—Au alloy and zirconia. Such a sensing electrode 10 is provided in a substantially rectangular shape in plan view at a position close to the distal end E1, being one end in the longitudinal direction of the sensor element 101, on the front surface Sa of the sensor element 101.

The catalytic activation of the sensing electrode 10 against an unburned hydrocarbon gas is disabled by preferably setting the composition of a Pt—Au alloy being its constituent material. That is, the decomposition reaction of an unburned hydrocarbon gas in the sensing electrode 10 is suppressed. In the HC sensor 100, accordingly, the potential of the sensing electrode 10 selectively varies with respect to (has correlation with) the unburned hydrocarbon gas, in accordance with its concentration. In other words, the sensing electrode 10 is provided so as to have high dependence of potential on concentration for an unburned hydrocarbon gas while having low dependence of potential on concentration for components of other measurement gas. This is implemented by including gold (Au) in the sensing electrode 10 as a conductive component (a noble metal component), in addition to platinum (Pt) being a main constituent.

Specifically, the sensing electrode 10 is formed such that the abundance ratio of Au (Au abundance ratio) in the sensing electrode 10 is 0.3 or more. Since the sensing electrode 10 is formed in such a manner, in the HC sensor 100, the detection sensitivity becomes higher than the case in which the sensing electrode 10 is formed as a cermet electrode of Pt and zirconia, as with the reference electrode 20. Thereby, the HC sensor 100 is adapted to be able to detect the unburned hydrocarbon gas at high detection sensitivity even when an unburned hydrocarbon gas contained in the exhaust gas G of an oxygen-excessive atmosphere generated in the engine main body 300, as described above, is a detection target.

In this specification, the Au abundance ratio means an area ratio of a portion covered with Au to a portion at which Pt is exposed in the surface of noble metal particles forming the sensing electrode 10. The Au abundance ratio is 1 when the area of the portion at which Pt is exposed is equal to the area of the portion covered with Au. In this specification, an Au abundance ratio is calculated from a peak intensity of a peak detected for Au and Pt, obtained by X-ray photoelectron spectroscopy (XPS) using a relative sensitivity coefficient method.

For an Au abundance ratio of 0.3 or more, in the sensing electrode 10, Au is concentrated on the surface of noble metal particles forming the sensing electrode 10. In more detail, an Au-rich Pt—Au alloy is formed near the surface of Pt-rich Pt—Au alloy particles. When such a state is achieved, the catalytic activation in the sensing electrode 10 is preferably disabled, increasing the dependence of the potential of the sensing electrode 10 on the concentration of an unburned hydrocarbon gas.

The volume ratio between noble metal components and zirconia in the sensing electrode 10 may be about from 5:5 to 8:2.

For the HC sensor 100 to preferably exhibit its function, the porosity of the sensing electrode 10 is preferably 10% or more and 30% or less, and the thickness of the sensing electrode 10 is preferably 5 µm or more. In particular, the porosity is more preferably 15% or more and 25% or less, and the thickness is more preferably 25 µm or more and 45 µm or less.

The plane size of the sensing electrode 10 may be appropriately set, and it suffices that, for example, the length in the longitudinal of the sensor element is about 0.2 mm to about 10 mm and the length perpendicular to the longitudinal direction is about from 1 mm to 5 mm.

The reference electrode 20 is an electrode substantially rectangular in plan view, which is provided inside the sensor element 101 and serves a reference when the concentration of a measurement gas is determined. The reference electrode 20 is formed as a porous cermet electrode made of Pt and zirconia.

The reference electrode 20 may be formed to have a porosity of 10% or more and 30% or less and a thickness of 5 µm or more and 15 µm or less. The plane size of the reference electrode 20 may be smaller than that of the sensing electrode 10 as illustrated in FIGS. 2A and 2B or may be equal to that of the sensing electrode 10.

The reference gas introduction layer 30 is a layer made of porous alumina, which is provided inside the sensor element 101 to cover the reference electrode 20. The reference gas introduction space 40 is an internal space provided on the base end E2 side of the sensor element 101. Air (oxygen), serving as a reference gas when the concentration of an unburned hydrocarbon gas is determined, is externally introduced into the reference gas introduction space 40.

The reference gas introduction space 40 and the reference gas introduction layer 30 are in communication with each other, and accordingly, in the use of the HC sensor 100, the surroundings of the reference electrode 20 are always filled with air (oxygen) through the reference gas introduction space 40 and the reference gas introduction layer 30. During the use of the HC sensor 100, therefore, the reference electrode 20 always has a constant potential.

The reference gas introduction space 40 and the reference gas introduction layer 30 are provided so as not to come into contact with a measurement gas owing to their surrounding solid electrolytes. This prevents the reference electrode 20 from coming into contact with the measurement gas even if the sensing electrode 10 is exposed to the measurement gas.

In the case illustrated in FIGS. 2A and 2B, the reference gas introduction space 40 is provided in such a manner that part of the fifth solid electrolyte layer 5 is in communication with the outside on the base end E2 side of the sensor element 101. The reference gas introduction layer 30 is provided so as to extend in the longitudinal direction of the sensor element 101 between the fifth solid electrolyte layer 5 and the sixth solid electrolyte layer 6. The reference electrode 20 is provided at a position below the center of gravity of the sensor element 101 in FIGS. 2A and 2B.

The surface protective layer 50 is a porous layer made of alumina, which is provided so as to cover at least the sensing electrode 10 on the front surface Sa of the sensor element 101. The surface protective layer 50 is provided as an electrode protective layer that prevents or reduces the degradation of the sensing electrode 10 due to continuous exposure to a measurement gas during the use of the HC sensor 100. In the case illustrated in FIGS. 2A and 2B, the surface protective layer 50 is provided so as to cover not only the sensing electrode 10 but also substantially all the portion of the front surface Sa of the sensor element 101 except for a predetermined range starting from the distal end E1.

As shown in FIG. 2B, the HC sensor 100 is equipped with a potentiometer 60 capable of measuring a potential difference between the sensing electrode 10 and the reference electrode 20. Although FIG. 2B schematically shows wiring between the potentiometer 60 and the sensing electrode 10 as well as the reference electrode 20, in an actual sensor element 101, connection terminals (not shown) are provided correspondingly to the electrodes on the front surface Sa or the rear surface Sb on the base end E2 side, and wiring patterns (not shown), which connect the electrodes and their corresponding connection terminals, are formed on the front surface Sa and in the element. The sensing electrode 10 and the reference electrode 20 are electrically connected with the potentiometer 60 via the wiring patterns and the connection terminals. In the preferred embodiment, the potential difference between the sensing electrode 10 and the reference electrode 20, measured by the potentiometer 60, serves as a HC detection signal sg11. In addition, such a potential difference is also referred to as a HC sensor output.

The sensor element 101 further includes a heater part 70, which performs temperature control of heating the sensor element 101 and maintaining the temperature of the sensor element 101, to enhance the oxygen ion conductivity of the solid electrolyte. The heater part 70 includes a heater electrode 71, a heater 72, a through-hole 73, a heater insulating layer 74, and a pressure diffusion hole 75.

The heater electrode 71 is an electrode formed so as to come into contact with the rear surface Sb of the sensor element 101 (the lower surface of the first solid electrolyte layer 1 in FIGS. 2A and 2B). Connecting the heater electrode 71 with an external power source (not shown) enables power feeding from the outside to the heater part 70.

The heater 72 is an electric resistor provided inside the sensor element 101. The heater 72, which is connected with the heater electrode 71 through the through-hole 73, generates heat by being fed power from the outside via the heater electrode 71 to heat the solid electrolytes forming the sensor element 101 and maintain their temperature.

In the case illustrated in FIGS. 2A and 2B, the heater 72 is buried while being vertically sandwiched between the second solid electrolyte layer 2 and the third solid electrolyte layer 3 so as to range from the base end E2 to the position below the sensing electrode 10 near the distal end E1. This enables the adjustment of the entire sensor element 101 to the temperature at which the solid electrolytes are activated.

The heater insulating layer 74 is an insulating layer made of an insulator such as alumina on the upper and lower surfaces of the heater 72. The heater insulating layer 74 is formed for the electrical insulation between the second solid electrolyte layer 2 and the heater 72 and for the electrical insulation between the third solid electrolyte layer 3 and the heater 72.

The pressure diffusion hole 75 is a part provided to penetrate the third solid electrolyte layer 3 and to be in communication with the reference gas introduction space 40, which is formed to mitigate an internal pressure rise associated with a temperature rise in the heater insulating layer 74.

When the concentration of an unburned hydrocarbon gas in the exhaust gas G from the engine main body 300 being a measurement gas is determined by use of the HC sensor 100 having the configuration described above, air (oxygen) is supplied to the reference gas introduction space 40, with the sensor element 101 in only a predetermined range, which starts from the distal end E1 and includes at least the sensing electrode 10, being disposed in an exhaust pipe 500 of an engine system 1000, and with the sensor element 101 on the base end E2 side being disposed apart from the space, as described above. The sensor element 101 is heated at an appropriate temperature of 300° C. to 800° C., preferably 400° C. to 700° C., and more preferably 400° C. to 600° C. by the heater 72.

In such a state, a potential difference occurs between the sensing electrode 10 exposed to the measurement gas (exhaust gas G) and the reference electrode 20 arranged in the atmosphere. As described above, however, the potential of the reference electrode 20 disposed under the air (having a constant oxygen concentration) atmosphere is maintained at a constant potential, whereas the potential of the sensing electrode 10 selectively has concentration dependence on the unburned hydrocarbon gas in the measurement gas (exhaust gas G), and therefore their potential difference (HC sensor output) substantially has a value corresponding to the concentration of the measurement gas present around the sensing electrode 10. Therefore, a certain functional relation (referred to as sensitivity characteristics) holds between the concentration of an unburned hydrocarbon gas and sensor output.

In the oxidation catalyst diagnosis system DS1, under the premise that the functional relation holds, the deterioration diagnosis of the oxidation catalyst 600 is performed by use of the HC detection signal sg11 which is the output from the HC sensor 100.

That is, sensitivity characteristics are experimentally identified by measuring sensor output in advance with a plurality of different mixed gases, each of which has a known unburned hydrocarbon gas concentration, used as measurement gases, and are stored in the electronic control device 200. The concentration of an unburned hydrocarbon gas on a downstream side of the oxidation catalyst 600 can be determined almost in real time by converting a HC sensor output, which varies from moment to moment in accordance with the concentration of an unburned hydrocarbon gas of a measurement gas, into the concentration of an unburned hydrocarbon gas on the basis of the sensitivity characteristics by the electronic control device 200. In the electronic control device 200, on the basis of the concentration of an unburned hydrocarbon gas, the degree of the deterioration of the oxidation catalyst 600 is determined.

Alternatively, it may be employed that the conversion to an unburned hydrocarbon gas concentration equivalent basis is omitted and a HC sensor output value (potential difference value) itself which is given as a HC detection signal sg11 is used for the deterioration diagnosis.

<Characteristic of Oxidation Catalyst and Basic Concept of Deterioration Diagnosis>

Next, characteristics of the oxidation catalyst 600 being a target of the deterioration diagnosis by the oxidation catalyst diagnosis system DS1 of the preferred embodiment, and a basic concept of the deterioration diagnosis will be described.

First, the characteristics of the oxidation catalyst 600 will be described. FIG. 3 is a view schematically showing a relation (conversion rate profile) between a temperature (catalyst temperature) and a conversion rate of the oxidation catalyst 600. FIG. 3 schematically shows the conversion rate profile Pf of the oxidation catalyst 600 (fresh article or also referred to just as fresh) in the Initial use (unused or just-started use) and the conversion rate profile Pa of the oxidation catalyst 600 (aged article or also referred to just as aged) used for a certain period of time.

The conversion rate is a value serving as an index of catalytic ability in the oxidation catalyst 600, and when the concentration of the unburned hydrocarbon gas in the vicinity on an upstream side of the oxidation catalyst 600 is referred to as a concentration Nu of an unburned hydrocarbon gas on an upstream side and the concentration of the unburned hydrocarbon gas in the vicinity on a downstream side is referred to as a concentration Nl of an unburned hydrocarbon gas on an downstream side, the conversion rate is defined by the following formula (1).

$$\text{Conversion rate } (\%) = 100 \times (Nu - Nl)/Nu \quad \text{(Formula 1)}$$

That is, the conversion rate represents a ratio of an unburned hydrocarbon gas not discharged from the oxidation catalyst 600 to a downstream side to an unburned hydrocarbon gas flown into the oxidation catalyst 600 from an upstream side. An oxidation catalyst 600 having a higher conversion rate comes to have higher catalytic ability.

More specifically, in a temperature range (adsorption region in FIG. 3) below a certain temperature T1 (about 150° C.), the oxidation catalyst 600 has a function (adsorptive capacity) of exclusively adsorbing an unburned hydrocarbon gas, and in a temperature range (oxidation region in FIG. 3) above a certain temperature T2 (commonly 150° C. to 200° C.), the oxidation catalyst 600 suitably exerts a capacity (oxidizing ability) of oxidizing an unburned hydrocarbon gas being an inherent function. In the temperature range between the temperature T1 and the temperature T2 (intermediate region in FIG. 3), the higher the temperature is, the lower the adsorptive capacity becomes and the higher the oxidizing ability becomes. Thus, the conversion rate is a value representing a ratio of an unburned hydrocarbon gas adsorbed or oxidized in the oxidation catalyst 600 to an unburned hydrocarbon gas flown from an upstream side into the oxidation catalyst 600.

As shown in FIG. 3, a conversion rate profile Pf of the fresh article is usually the highest (approximately about 90%) in the oxidation region and the conversion rate in the adsorption region is lower than that in the oxidation region. Furthermore, the conversion rate becomes minimum at an upper limit temperature T1 (about 150° C.) of the adsorption region, and the conversion rate tends to increase as a temperature increases in the intermediate region.

However, a temperature of the oxidation catalyst 600 can vary from hour to hour depending on a temperature of the exhaust gas G (exhaust gas temperature) which is discharged from the engine main body 300 and flows into through the exhaust pipe 500, and therefore an actual conversion rate varies from hour to hour.

The oxidation catalyst 600 having a high conversion rate at the stage of a fresh article is deteriorated due to continued use. That is, the conversion rate of the oxidation catalyst 600 is reduced regardless of a temperature as the fresh article becomes the aged article due to the continued use. A magnitude relation between the adsorption region and the oxidation region in a conversion rate profile Pa of the aged article is mainly similar to that of the Pf of the fresh article; however the conversion rate of the aged article is smaller than that of the fresh article at the same temperature.

As a result of the use thus continued of the oxidation catalyst 600, once the conversion rate is reduced below a predetermined level, the oxidation catalyst 600 cannot exert an inherent desired function. For example, in the case that the engine system 1000 is mounted on an automobile, a problem such that the automobile does not satisfy environmental standards arises. The oxidation catalyst diagnosis system DS1 of the preferred embodiment enables to replace the aged article of the oxidation catalyst 600 in the engine system 1000 with the fresh article timely by determining whether the deterioration occurs to a controversial extent (to the extent requiring replacement, etc.) in the oxidation catalyst 600 being the aged article.

Conceptually, data (threshold data) corresponding to a threshold profile T in which the threshold value of the conversion rate, as described in FIG. 3, is set every temperature, is previously prepared and stored in the electronic control device 200 constituting the oxidation catalyst diagnosis system DS1. And then, a temperature and a conversion rate of the oxidation catalyst 600 being a diagnosis target are determined. In the case that the obtained conversion rate is smaller than the threshold value at the temperature, it is determined that the oxidation catalyst 600 is deteriorated.

However, while it is necessary to determine the concentration of the unburned hydrocarbon gas on both of upstream and downstream sides of the oxidation catalyst 600 in order to actually calculate the conversion rate, the oxidation catalyst diagnosis system DS1 of the preferred embodiment is not provided with a HC sensor on an upstream side of the oxidation catalyst 600. In the preferred embodiment, using the fact that the concentration Nu of an unburned hydrocarbon gas on an upstream side of the oxidation catalyst 600 lies in a certain range, the oxidation catalyst diagnosis system DS1 is adapted to diagnose the degree of deterioration of the oxidation catalyst 600 based on the concentration Nl of an unburned hydrocarbon gas on a downstream side determined based on the output value (HC detection signal sg11) in the HC sensor 100 provided downstream of the oxidation catalyst 600, the temperature of the oxidation catalyst 600 identified by an exhaust gas temperature detection signal sg12 from a temperature sensor 110 provided upstream of the oxidation catalyst 600, and threshold data of the concentration Nl of an unburned hydrocarbon gas on a downstream side which is previously defined according to the temperature of the catalyst and stored in the storage portion of the electronic control device 200. That is, the oxidation catalyst diagnosis system DS1 is adapted to perform deterioration diagnosis by using the concentration of an unburned hydrocarbon gas in the exhaust gas G undergoing the oxidation catalyst 600 as a direct diagnosis target. A specific content of the diagnosis will be described later.

Figure 4:
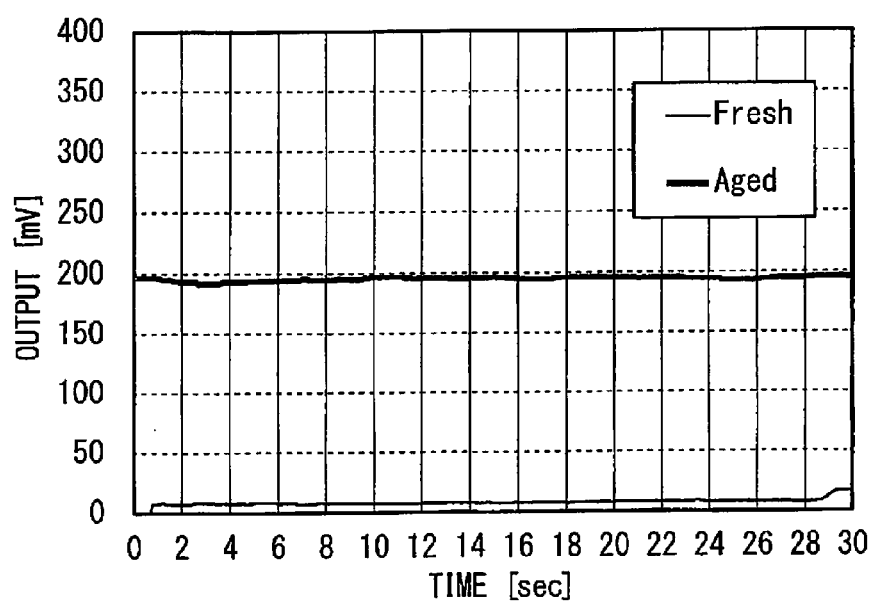
FIG. 4 is a view showing output values of a HC sensor 100 for the fresh article and the aged article, respectively, in flowing actual exhaust gases (containing HC, CO and $O_2$) as the test gases having the approximately same unburned hydrocarbon gas concentrations from an upstream side.

FIG. 4 is a view showing output values of a HC sensor 100 in flowing actual exhaust gases (containing HC, CO and $O_2$) as the test gases having the approximately same unburned hydrocarbon gas concentrations from an upstream side, on both cases where an oxidation catalyst 600 being a fresh article is used and an oxidation catalyst 600 being an aged article is used in the diesel engine system 1000. In addition, the temperature of the oxidation catalyst 600 is set to 200° C. As shown in FIG. 4, the output is almost close to 0 mV in the fresh article, whereas the output of 200 mV is obtained in the aged article. This result means that almost all of the unburned hydrocarbon gas is oxidized in the fresh article, whereas the unburned hydrocarbon gas is not completely oxidized, and the remainder is discharged as it is in the aged article.

Figure 5:
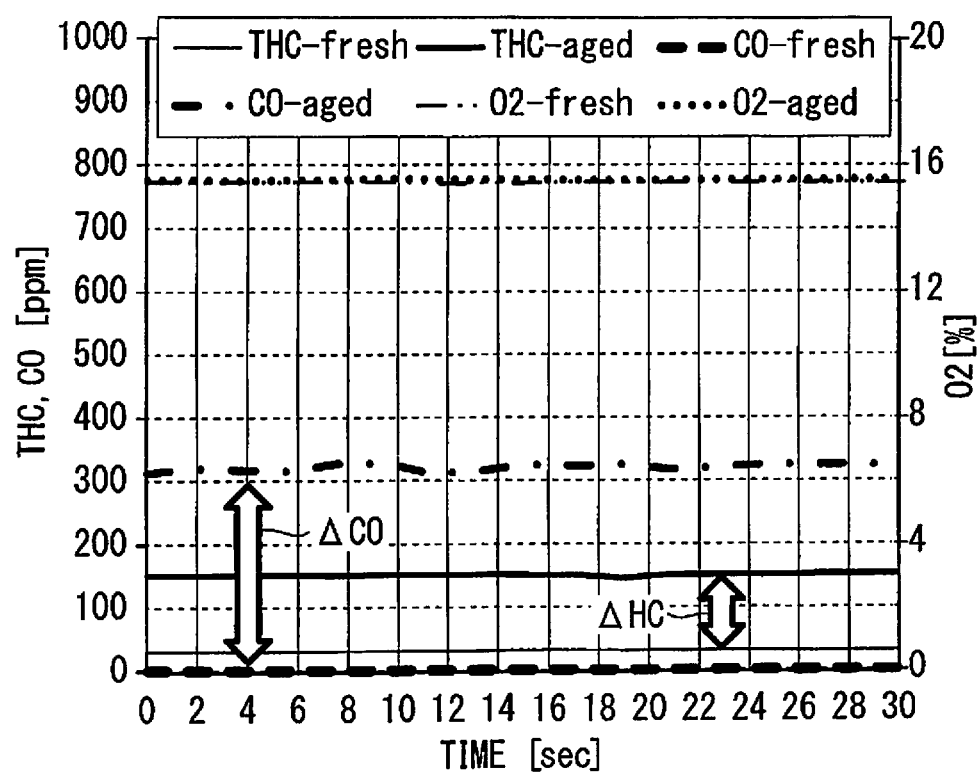
FIG. 5 is a graph showing the results at the time when in the detection by the HC sensor 100 shown in FIG. 4, gas analysis is performed using an gas analyzer at the downstream of the HC sensor 100.

Further, FIG. 5 is a view showing the results at the time when in the detection by the HC sensor 100 shown in FIG. 4, gas analysis is performed using an gas analyzer at the downstream of the HC sensor 100. In addition, "THC" of a vertical axis on a left side in FIG. 5 means a total of hydrocarbon gases (typical hydrocarbon gas) excluding CO (same applies to following drawings). It is confirmed from FIG. 5 that measured concentration values of THC and CO of the aged article are higher than those of the fresh article by ΔHC and ΔCO, respectively. Since the concentration Nu of an unburned hydrocarbon gas on an upstream side is constant, the results shown in FIG. 4 and FIG. 5 suggest that when the oxidation catalyst diagnosis system DS1 of the preferred embodiment is used, in the aged article, the occurrence of the deterioration of the conversion rate in the oxidation catalyst 600 can be detected based on the results of direct measurement of unburned hydrocarbon gas in the exhaust gas by the HC sensor 100. A specific diagnosis procedure will be described later.

Strictly speaking, since an amount of the unburned hydrocarbon gas oxidized in the fresh article is larger than that in the aged article, strictly, an oxygen concentration of the fresh article is expected to be higher than that of the aged article; however, there is little difference in oxygen concentration between the fresh article and the aged article in FIG. 5. The reason for this is that the concentration (ppm order) of oxygen generated by oxidation is low enough compared with the concentration (% order) of oxygen inherently present in a test gas flown into from an upstream side.

Figure 6A:
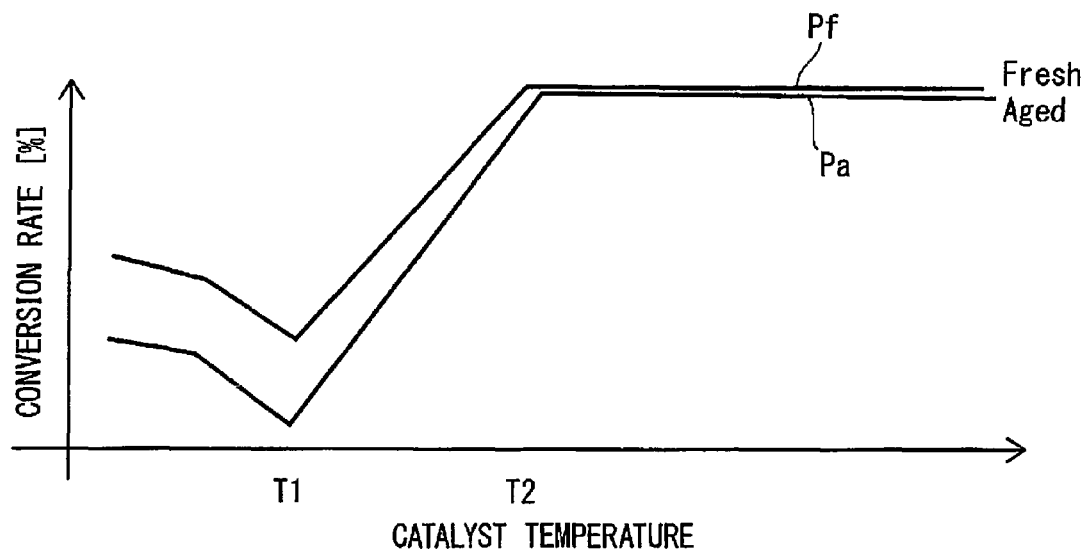
FIGS. 6A and 6B are each a view schematically showing another example of a conversion rate profile Pa.
Figure 6B:
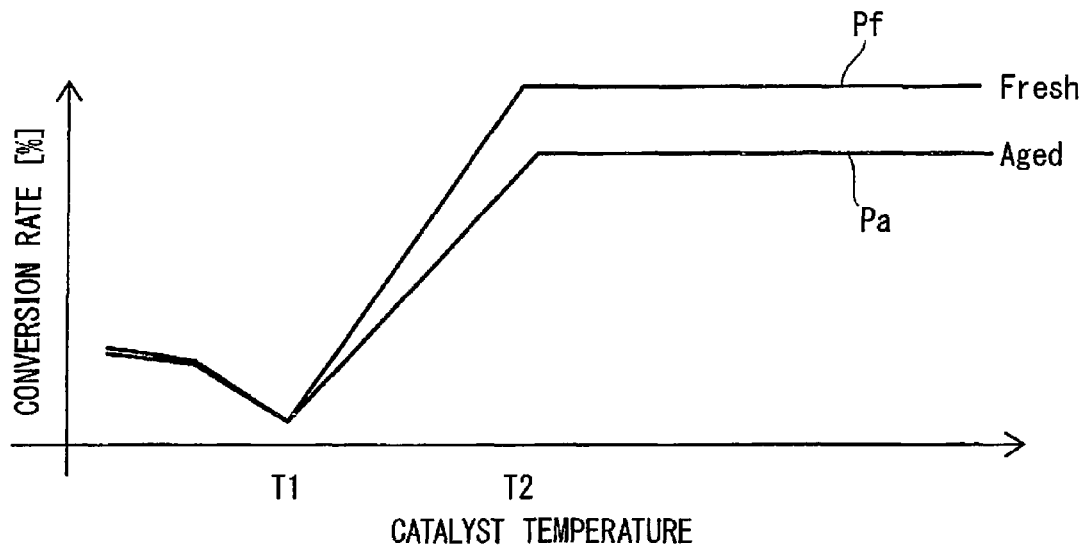

Further, a value of the conversion rate profile Pa of the aged article, shown in FIG. 3, is smaller than a value of the conversion rate profile Pf by an approximately constant value at all temperatures; however, this is just an exemplification. FIGS. 6A and 6B are each a view schematically showing another example of a conversion rate profile Pa. That is, as for the conversion rate profile Pa of the aged article, there may be cases where the degree of deterioration in the adsorption region is larger than that in the oxidation region as shown in FIG. 6A, and in contrast, there may be cases where the degree of deterioration in the oxidation region is larger than that in the adsorption region as shown in FIG. 6B. Accordingly, in the case of FIG. 6A, it is preferred to timely detect the deterioration occurring in a temperature region of the temperature T1 or less, and in the case of FIG. 6B, it is preferred to timely detect the deterioration occurring in a temperature region of the temperature T2 or more.

<Comparison with Other Technique>

Next, as for a technique of directly measuring an unburned hydrocarbon gas in the exhaust gas G by the HC sensor 100, which is performed in the oxidation catalyst diagnosis system DS1 of the preferred embodiment, the advantageous effect over other oxidation catalyst diagnosis techniques will be described.

Figure 7:
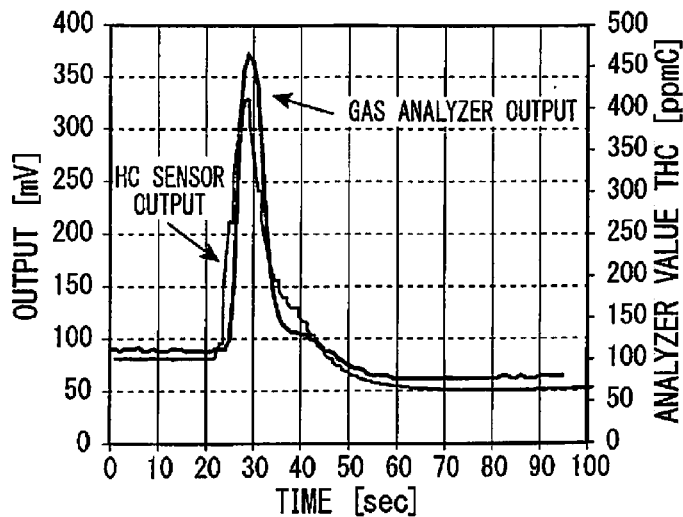
FIG. 7 is a view showing changes in an output value in the HC sensor 100 at the time when an extremely small amount of fuel is injected for a short time from a fuel injection valve 301 in the middle of an operation under a certain condition of an engine system 1000 provided with an aged article as an oxidation catalyst 600, as well as changes in a hydrocarbon gas concentration in a gas analyzer provided in the vicinity of the HC sensor 100.

FIG. 7 is a view showing changes in an output value in the HC sensor 100 at the time when an extremely small amount of fuel is injected for a short time from a fuel injection valve 301 in the middle of an operation under a certain condition of an engine system 1000 provided with an aged article as an oxidation catalyst 600, as well as changes in a hydrocarbon gas concentration in a gas analyzer provided in the vicinity of the HC sensor 100. In addition, "ppmc" of the unit of a vertical axis on a right side in FIG. 7 indicates to represent a hydrocarbon gas concentration on the carbon atom equivalent basis by the unit of ppm.

When such an extremely small amount of fuel injection is executed in addition to the exhaust gas G steadily discharged in association with an operation of the engine main body 300, injected fuel vaporized inside of the engine main body 300 is discharged to the exhaust pipe 500 in a superimposed manner, and therefore an unburned hydrocarbon gas is sent to the oxidation catalyst 600 instantaneously at a concentration higher than a steady state. In addition, more specifically, injection of the fuel was executed under the conditions of a delay angle of 88°, an injection amount of 1 mg/stroke and an injection time of 6 seconds at a post-injection in the engine system 1000 in which an engine speed is 2500 rpm and torque is 20 Nm. In addition, the temperature of the oxidation catalyst 600 identified from an output value of the temperature sensor 110 was 200° C.

From FIG. 7, a peak corresponding to fuel injection is recognized on each of the output profile of the HC sensor 100 and the output profile of the gas analyzer, and it is understood that both profile shapes substantially agree with a time axis. This indicates that the oxidation catalyst diagnosis system DS1 of the preferred embodiment has excellent responsiveness to the variation of the concentration of an unburned hydrocarbon gas and can detect the unburned hydrocarbon gas with high accuracy and in real time, and hence means that the system can promptly perform the deterioration diagnosis of the oxidation catalyst 600.

Figure 8:
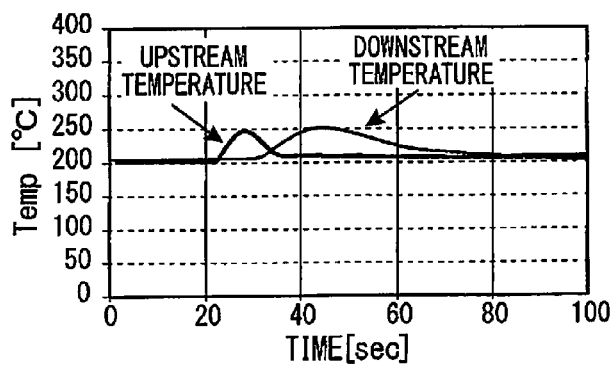
FIG. 8 is a view showing an appearance of changes in output value for applying a ΔT method.
Figure 9:
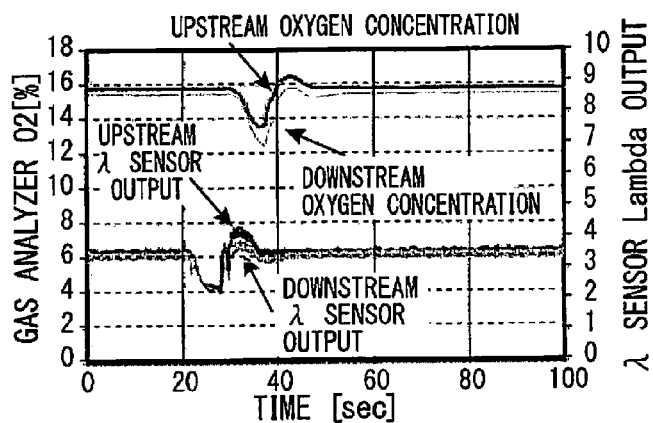
FIG. 9 is a view showing an appearance of changes in output value for applying a Δλ method.

On the other hand, FIG. 8 and FIG. 9, shown for comparison, are each view showing an appearance of changes in output value which are obtained under the same conditions as in the results shown in FIG. 7 and required for applying a ΔT method and a Δλ method.

The results shown in FIG. 8 was obtained by measuring a temperature on an upstream side of the oxidation catalyst 600 by the temperature sensor 110, and measuring a temperature on the downstream side by another temperature sensor provided for evaluation on a downstream side of the oxidation catalyst 600. FIG. 8 shows that a temperature rise occurring in response to fuel injection on both of upstream/downstream sides is detected, but peak positions are inevitably deviated due to a difference in installation position and the peak of downstream is broad with respect to a time axis. Further, there is little difference in temperature between peaks. In addition, not shown in drawings, a difference in temperature value is finally recognized between two peaks when the fuel injection amount is increased.

It can be said from such a result that the diagnosis technique performed based on the oxidation catalyst diagnosis system DS1 of the preferred embodiment is superior in measurement accuracy and promptness of diagnosis to the ΔT method.

Further, the results shown in FIG. 9 was obtained by providing λ sensor for evaluation on both of upstream/downstream sides of the oxidation catalyst 600, providing a gas analyzer used in measurement shown in FIG. 7 on both of upstream/downstream sides of the oxidation catalyst 600, and measuring by the λ sensor and the gas analyzer. Comparing output profiles of the gas analyzers on upstream/downstream sides of four profiles shown in FIG. 9, since a reduction of an oxygen concentration associated with fuel injection on the downstream is larger than that on the upstream, it is confirmed that oxygen is reduced by the oxidation of the unburned hydrocarbon gas in the oxidation catalyst 600. However, comparing the output profiles of the λ sensor on upstream/downstream sides, degrees of reduction of λ values associated with fuel injection are not different. Since λ sensor measures a concentration of remaining oxygen after combustion of the unburned hydrocarbon and oxygen, a difference in output between the upstream λ sensor and the downstream λ sensor is not generated in principle.

This result indicates that a reduction of oxygen by the oxidation of the unburned hydrocarbon gas in the oxidation catalyst 600 is not captured by two λ sensors. This means in short that the oxidation catalyst diagnosis system DS1 of the preferred embodiment can realize the diagnosis of the degree of deterioration of the oxidation catalyst 600 which cannot be performed by the Δλ method.

<Specific Diagnosis Technique-Passive OBD and Active OBD>

Subsequently, a specific technique of diagnosing the degree of deterioration of the oxidation catalyst 600 which is performed in the oxidation catalyst diagnosis system DS1 of the preferred embodiment, will be described. A diagnosis technique performed in the preferred embodiment is broadly divided into Passive OBD and Active OBD, appropriately used separately according to the purpose, or used in combination thereof.

In the preferred embodiment, Passive OBD, schematically describing, is a technique of performing diagnosis by directly using a state of an ordinary operation under which the engine main body 300 continuously discharges the exhaust gas G through the exhaust pipe 500. Thus, an unburned hydrocarbon gas to be used for diagnosis in Passive OBD is limited to the unburned hydrocarbon gas contained in the exhaust gas G.

Passive OBD can be performed at any timing as long as the engine main body 300 is under an ordinary operation state. Or, it may be employed that the oxidation catalyst diagnosis system DS1 automatically performs Passive OBD intermittently or continuously, even though a particular instruction of execution is not given. However, since the concentration of an unburned hydrocarbon gas being a detection target by the HC sensor 100 does not exceed a concentration in the exhaust gas G discharged from the engine main body 300, particularly, in the oxidation region in which the conversion rate is relatively high even in the case of the aged article, its detection amount tends to decrease. In some cases, this point may have an effect on diagnosis accuracy.

On the other hand, in the preferred embodiment, Active OBD, schematically describing, is a technique in which an extremely small amount of fuel is intentionally injected for a short time during an operation of the engine main body 300 to generate a hydrocarbon gas for diagnosis, and diagnosis is performed with an atmosphere including the generated hydrocarbon gas targeted for diagnosis. That is, a hydrocarbon gas atmosphere to be used for diagnosis in Active OBD is formed by superimposing such a hydrocarbon gas generated for diagnosis on an unburned hydrocarbon gas contained in an ordinary exhaust gas G. However, in the following description, for convenience sake, a hydrocarbon gas generated for diagnosis is referred to as an unburned hydrocarbon gas. When performing Active OBD, even if the oxidation catalyst 600 is a fresh article with high conversion rate, since a detection amount of the unburned hydrocarbon gas in the HC sensor 100 is increased compared with Passive OBD, it becomes possible to perform the diagnosis more certainly.

Although Active OBD seems disadvantageous from the viewpoint of securing fuel economy in the engine system 1000 since it intentionally performs fuel injection, as described later, the total amount of fuel injection performed in the oxidation catalyst diagnosis system DS1 of the preferred embodiment, is small enough compared with fuel injection performed for other purpose in the engine system 1000 or fuel injection in performing other diagnosis technique, and an impact on fuel economy remains in the minimum.

<Example of Procedure of Passive OBD>

Figure 10:
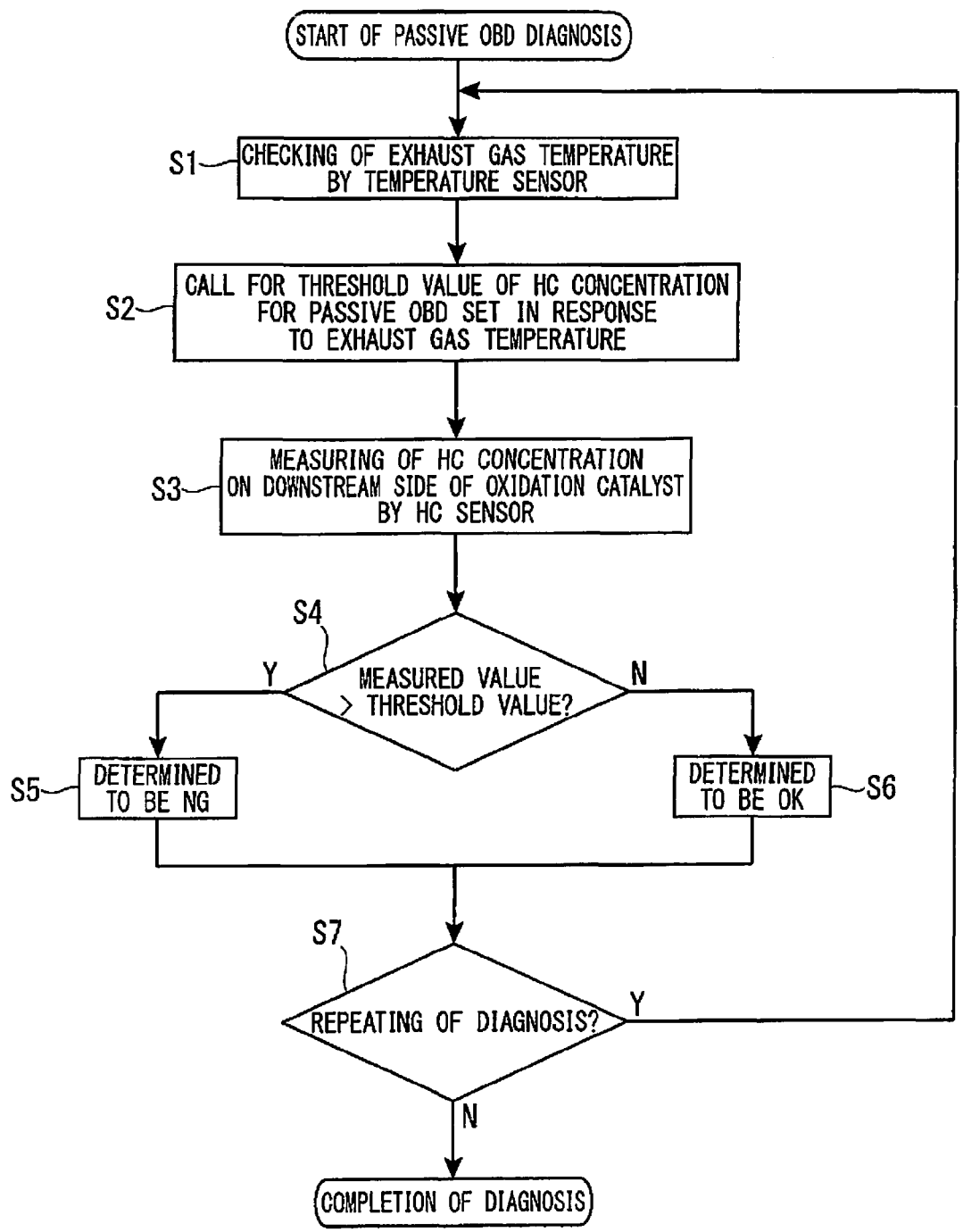
FIG. 10 is a view showing an example of a procedure of diagnosis based on Passive OBD.

FIG. 10 is a view showing an example of a procedure of diagnosis based on Passive OBD. The diagnosis by Passive OBD starts with checking a temperature of the exhaust gas G (exhaust gas temperature) in the vicinity on an upstream side of the oxidation catalyst 600 by the temperature sensor 110 (step S1). More specifically, the electronic control device 200 acquires exhaust gas temperature detection signals sg12 sent from the temperature sensor 110 and thereby the exhaust gas temperature is identified. Such an exhaust gas temperature is regarded as a temperature of the oxidation catalyst 600 at the point in time.

Subsequently, the electronic control device 200 calls the threshold value of the concentration of an unburned hydrocarbon gas for Passive OBD corresponding to the exhaust gas temperature from the threshold data for Passive OBD previously stored in the storage portion (step S2). The threshold value is previously set in all temperatures within a possible temperature range of the oxidation catalyst 600 (approximately −40° C. to 1000° C.). Since there is not a particular restriction on how to give the threshold value, the threshold value may be given as a continuous function of a temperature of the oxidation catalyst 600 (exhaust gas temperature) or given as a fixed value for every temperature range.

Then, in the HC sensor 100, an unburned hydrocarbon gas concentration Nl on a downstream side of the oxidation catalyst 600 is measured (step S3). More specifically, the exhaust gas G whose temperature has been measured by the temperature sensor 110 reaches the oxidation catalyst 600, adsorption or oxidation of an unburned hydrocarbon gas takes place inside the oxidation catalyst 600, and the rest of the unburned hydrocarbon gas is discharged to the downstream side, and at this timing, the electronic control device 200 acquires, as a HC detection signal sg11, a potential difference generated between the sensing electrode 10 and the reference electrode 20 (HC sensor output) in the HC sensor 100, and the unburned hydrocarbon gas concentration Nl on a downstream side is calculated based on a value of the potential difference and a sensitivity characteristic of the HC sensor 100 which has been identified in advance.

Check of the exhaust gas temperature by the temperature sensor 110 and measurement of the concentration Nl of an unburned hydrocarbon gas on a downstream side by the HC sensor 100 may be performed simultaneously.

After measurement of the concentration Nl of an unburned hydrocarbon gas on a downstream side and call of the threshold value, the electronic control device 200 compares the measured value to the threshold value (step S4), and when the former is larger than the latter (YES in the step S4), the electronic control device 200 determines that deterioration occurs to a controversial extent (requiring replacement, etc.) in the oxidation catalyst 600 (to be NG) (step S5), and when the latter is larger than the former (NO in the step S4), the electronic control device 200 determines that such deterioration does not occur (to be OK) (step S6).

When diagnosis is repeated after the diagnosis regardless of whether determined to be NG or to be OK (YES in the step S7), this process is repeated again from checking an exhaust gas temperature by the temperature sensor 110. If not so, the diagnosis is ended as it is (NO in the step S7).

<Detail of Diagnosis by Passive OBD>

The reason why the degree of deterioration of the oxidation catalyst 600 can be diagnosed by the procedure shown in FIG. 10, particularly, the reason why the deterioration can be diagnosed by comparing the measured value of the concentration Nl of an unburned hydrocarbon gas on a downstream side to the threshold value will be described based on FIG. 11 and FIG. 12.

Figure 11:
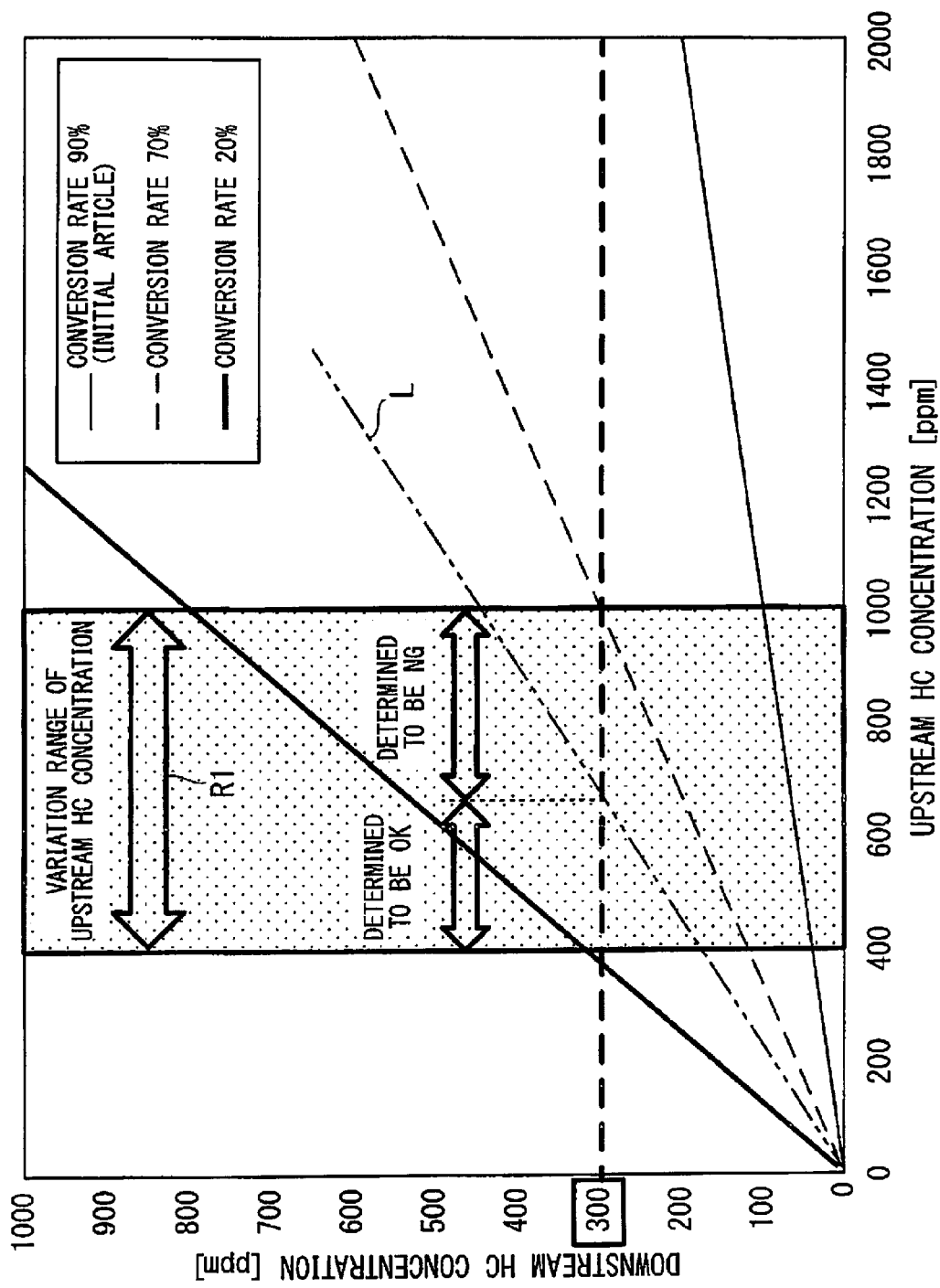
FIG. 11 is a view showing a relation between the concentration Nu of an unburned hydrocarbon gas on an upstream side and the concentration Nl of an unburned hydrocarbon gas on a downstream side in several conversion rates in the case where a temperature of an oxidation catalyst 600 is in an oxidation region in which a temperature is higher than T2.

First, FIG. 11 is a view showing a relation between the concentration Nu of an unburned hydrocarbon gas on an upstream side and the concentration Nl of an unburned hydrocarbon gas on a downstream side in several conversion rates in the case where a temperature of an oxidation catalyst 600 is in an oxidation region in which a temperature is higher than T2 (hereinafter, the temperature of the oxidation catalyst 600 in this case is denoted by Ta). For example, Ta is 200° C.

Figure 12:
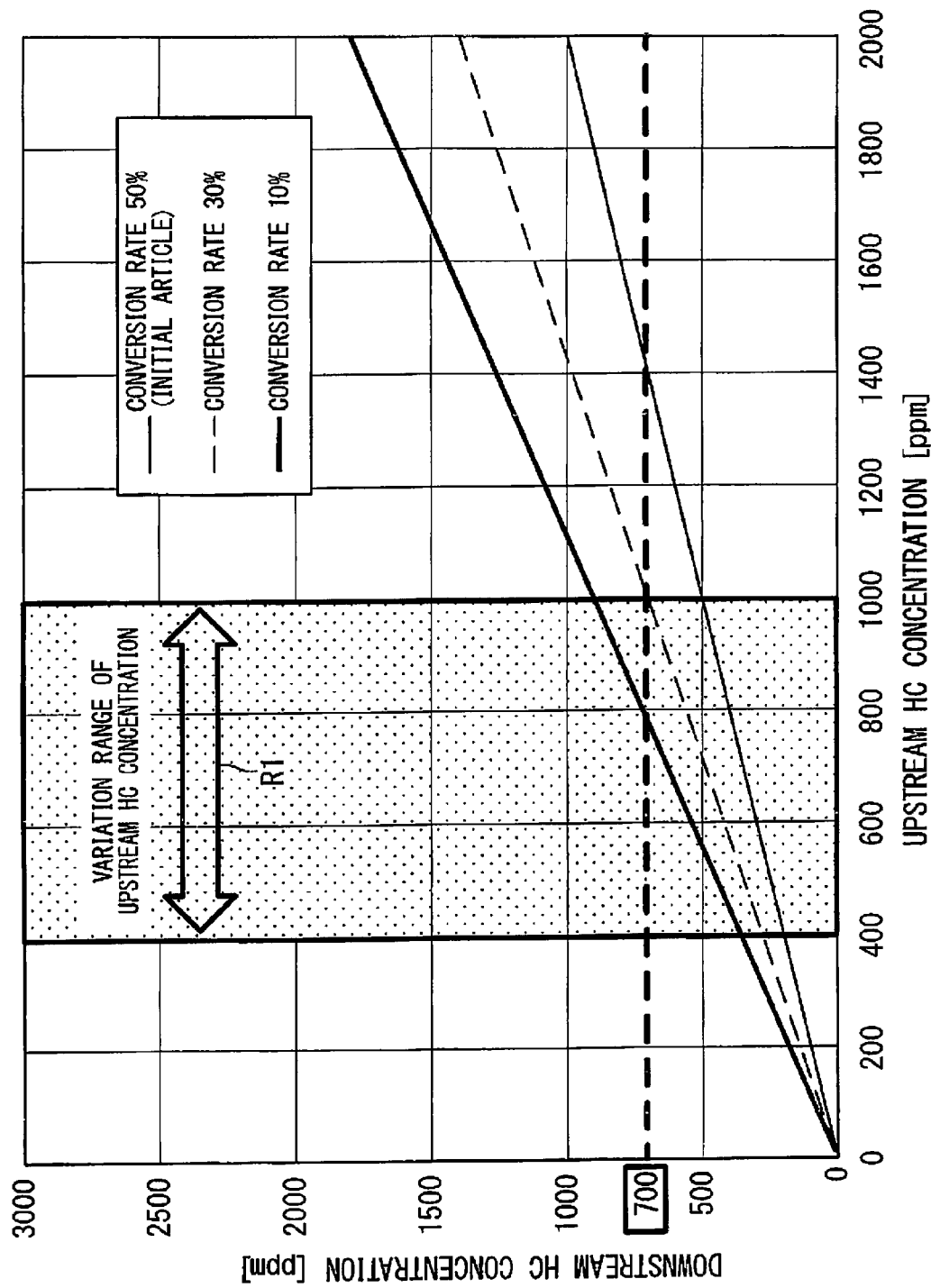
FIG. 12 is a view showing a relation between the concentration Nu of an unburned hydrocarbon gas on an upstream side and the concentration Nl of an unburned hydrocarbon gas on a downstream side in several conversion rates in the case where a temperature of an oxidation catalyst 600 is in an adsorption region in which a temperature is T1 or lower.

On the other hand, FIG. 12 is a view showing a relation between the concentration Nu of an unburned hydrocarbon gas on an upstream side and the concentration Nl of an unburned hydrocarbon gas on a downstream side in several conversion rates in the case where a temperature of an oxidation catalyst 600 is in an adsorption region in which a temperature is T1 or lower (hereinafter, the temperature of the oxidation catalyst 600 in this case is denoted by Tb). For example, Tb is 150° C.

Since the conversion rate is defined by the above-mentioned Formula 1, when the horizontal axis corresponds to the concentration Nu of an unburned hydrocarbon gas on an upstream side and the vertical axis corresponds to the concentration Nl of an unburned hydrocarbon gas on a downstream side like FIG. 11 and FIG. 12, the conversion rate is represented by a function of a slope of a straight line. Specifically, the slope of a straight line decreases as the conversion rate of the oxidation catalyst 600 increases. In addition, in FIG. 11 and FIG. 12, the concentration Nu of an unburned hydrocarbon gas on an upstream side is represented by the term "upstream HC concentration" and the concentration Nl of an unburned hydrocarbon gas on a downstream side is represented by the term "downstream HC concentration" (the same applies to FIG. 14 and FIG. 15).

In addition, in the preferred embodiment, a range of the conversion rate in which it is provided that controversial deterioration does not occur (acceptable) in the oxidation catalyst 600, is referred to as an allowable conversion rate range. The allowable conversion rate range may be optionally set in consideration of a state of the oxidation catalyst 600, whereas an upper limit thereof is usually 100% and therefore only a lower limit is optionally set.

In FIG. 11 showing an example at the temperature Ta, a relation between the concentration Nu of an unburned hydrocarbon gas on an upstream side and the concentration Nl of an unburned hydrocarbon gas on a downstream side is indicated by a thin solid line, a broken line and a thick solid line for the conversion rates of 90%, 70% and 20%, respectively. In addition, in the case of the temperature Ta, the oxidation catalyst having a conversion rate of 90% is assumed as a fresh article. For example, in the case of a fresh article having a conversion rate of 90%, when the concentration Nu of an unburned hydrocarbon gas on an upstream side of the oxidation catalyst 600 is 1000 ppm, the concentration Nl of an unburned hydrocarbon gas on a downstream side of the oxidation catalyst 600 is 100 ppm.

On the other hand, in FIG. 12 showing an example at temperature Tb, a relation between the concentration Nu of an unburned hydrocarbon gas on an upstream side and the concentration Nl of an unburned hydrocarbon gas on a downstream side is indicated by a thin solid line, a broken line and a thick solid line for the conversion rates of 50%, 30% and 10%, respectively. In addition, when the temperature is Tb, the oxidation catalyst having a conversion rate of 50% is assumed as a fresh article. Incidentally, as described above, the conversion rate in the adsorption region is usually smaller than the conversion rate in the oxidation region.

Further, as described above, in the preferred embodiment, it is previously found empirically that the concentration Nu of an unburned hydrocarbon gas on an upstream side varies constantly depending on operating conditions of the engine main body 300; however, the concentration Nu varies within a predetermined concentration range. In FIG. 11 and FIG. 12, a range of at least 400 ppm and at most 1000 ppm is assumed to be the variation range R1 of the concentration Nu of an unburned hydrocarbon gas on an upstream side (hereinafter, referred to as a variation range of upstream HC concentration). This means that, although a specific value of the concentration Nu of an unburned hydrocarbon gas on an upstream side in performing the diagnosis by Passive OBD is not identified in the preferred embodiment since measurement is not performed, the concentration value is surely regarded as a value within a range of the variation range R1 of upstream HC concentration.

Here, when the conversion rate is 70% or more in the case of the temperature Ta shown in FIG. 11, it is provided that controversial deterioration does not occur in the oxidation catalyst 600. In this case, a range of 70% or more is an allowable conversion rate range. A measurement value of the concentration Nl of an unburned hydrocarbon gas on a downstream side of the oxidation catalyst 600 satisfying such an allowable conversion rate range is 300 ppm or less. This is because, when the conversion rate is 70% or more, the slope of the straight line corresponding to Formula 1 in FIG. 11 is always smaller than the slope of the straight line of the conversion rate of 70%, which passes through a point (1000, 300).

Namely, this means that, if the threshold value to be compared with a measurement value of the concentration Nl of an unburned hydrocarbon gas on a downstream side by the HC sensor 100 is set to 300 ppm, all of the oxidation catalysts 600 in which an actual conversion rate lies within an allowable conversion rate range of 70% or more, are certainly determined to be OK in Passive OBD.

In addition, in the case of such a temperature Ta, if the threshold value is set to 300 ppm, a value of the concentration Nl of an unburned hydrocarbon gas on a downstream side becomes larger than 300 ppm in the oxidation catalysts 600 in which an actual conversion rate is less than 20% no matter which value in the variation range R1 of upstream HC concentration the concentration Nu of an unburned hydrocarbon gas on an upstream side is. Namely, this means that when the threshold value is set to 300 ppm, all of the oxidation catalysts 600 in which an actual conversion rate is less than 20%, are certainly determined to be NG in Passive OBD.

On the other hand, in the case of the temperature Tb shown in FIG. 12, a range of the conversion rate of 30% or more is defined as an allowable conversion rate range considering that a temperature of the oxidation catalyst 600 lies in the adsorption region, and a threshold value is set to 700 ppm higher than the case of the temperature Ta. In such a case, controversial deterioration does not occur in the oxidation catalyst 600 as long as the conversion rate satisfies the allowable conversion rate range of 30% or more, and the oxidation catalyst 600 is certainly determined to be OK.

However, in the case of such a temperature Tb, the oxidation catalyst 600 can be determined to be OK even if the conversion rate of the oxidation catalyst 600 is 0%. This is because, when the conversion rate is 0%, possible values of the concentration Nl of an unburned hydrocarbon gas on a downstream side is at least 400 ppm and at most 1000 ppm similar to those of the concentration Nu of an unburned hydrocarbon gas on an upstream side, and therefore the possible value may become smaller than 700 ppm of the threshold value. Thus, such a condition that the oxidation catalyst 600 is certainly determined to be NG does not occur in contrast to the case of the temperature Ta.

In contrast to these, for example, when an actual conversion rate of the oxidation catalyst 600 in the case of the temperature Ta is at least 20% and not more than 70% like a straight line L indicated by a chain double-dashed line in FIG. 11, whether the oxidation catalyst 600 is determined to be NG or to be OK in Passive OBD depends on an actual concentration Nu of an unburned hydrocarbon gas on an upstream side in during diagnosis which is not known as a value. More specifically, the case in which a value of the concentration Nl of an unburned hydrocarbon gas on a downstream side is 300 ppm becomes a boundary, if a value of the concentration Nu of an unburned hydrocarbon gas on an upstream side is close to 400 ppm, the catalyst is determined to be OK since the value of the concentration Nl of an unburned hydrocarbon gas on a downstream side is less than 300 ppm (falls within a range of less than 300 ppm in the straight line L), and if a value of the concentration Nu of an unburned hydrocarbon gas on an upstream side is close to 1000 ppm, the catalyst is determined to be NG since the value of the concentration Nl of an unburned hydrocarbon gas on a downstream side is 300 ppm or more (falls within a range of 300 ppm or more in the straight line L).

Similarly, when the conversion rate is at least 0% and not more than 30% in the case of the temperature Tb, whether the oxidation catalyst 600 is determined to be NG or to be OK in Passive OBD depends on a value of an actual concentration Nu of an unburned hydrocarbon gas on an upstream side in during diagnosis. More specifically, the case in which a value of the concentration Nl of an unburned hydrocarbon gas on a downstream side is 700 ppm becomes a boundary, if a value of the concentration Nu of an unburned hydrocarbon gas on an upstream side is close to 400 ppm, the catalyst is determined to be OK since the value of the concentration Nl of an unburned hydrocarbon gas on a downstream side is less than 700 ppm (falls within a range of less than 700 ppm in the straight line L), and if a value of the concentration Nu of an unburned hydrocarbon gas on an upstream side is close to 1000 ppm, the catalyst is determined to be NG since the value of the concentration Nl of an unburned hydrocarbon gas on a downstream side is 700 ppm or more (falls within a range of 700 ppm or more in the straight line L).

These mean that even though the actual conversion rate of the oxidation catalyst 600 is smaller than a lower limit value of the allowable conversion rate range (70% for the temperature Ta and 30% for the temperature Tb) which is a reference in setting the threshold value related to the concentration Nl of an unburned hydrocarbon gas on a downstream side, the oxidation catalyst 600 can be determined to be OK. However, although the value of the concentration Nu of an unburned hydrocarbon gas on an upstream side arbitrarily varies within the variation range R1 of upstream HC concentration, the smaller the actual conversion rate is, the larger a concentration range in which the catalyst is determined to be NG in the variation range R1 of upstream HC concentration, and therefore a probability of being determined to be NG is estimated to be large. That is, it is thought that the frequency of being faultily determined to be OK is high when the actual conversion rate is close to the lower limit value of the allowable conversion rate range being a reference value in setting a threshold value. This suggests that with respect to the threshold value in performing the diagnosis by Passive OBD, although the threshold value is set according to the allowable conversion rate range which can be arbitrarily defined, if the threshold value of the concentration Nl of an unburned hydrocarbon gas on a downstream side is set a little less (that is, the conversion rate giving a threshold value is set a little more), that is to say, the threshold value is set to a safety side, a practical problem is small even though some wrong diagnosis is generated.

Or, even though the catalyst happens to be faultily determined to be OK by one diagnosis, if the diagnosis system is configured to diagnose repeatedly as required, it is thought, for the oxidation catalyst 600 in which an actual conversion rate becomes smaller due to advancing deterioration, that a frequency (probability) of being determined to be NG is larger. Thus, it is conceivable to employ a provision in which practical detection accuracy is enhanced by selecting to perform repetitive diagnosis in the procedure of FIG. 10, and configuring the system to accumulate the result of diagnosis for every diagnosis in a storage portion (not shown) of the electronic control device 200, and to diagnose the degree of deterioration of the oxidation catalyst 600 based on the accumulated results. For example, it may be employed that when of number of times of predetermined diagnosis, the frequency of being determined to be NG is a certain reference number or less, the controversial deterioration is determined not to occur in the oxidation catalyst 600, and when the number of times exceeds a certain reference number, the controversial deterioration is determined to occur in the oxidation catalyst 600. In addition, when the repetitive diagnosis is performed, since the temperature of the oxidation catalyst 600 can vary diagnosis-to-diagnosis, the used threshold value can differ diagnosis-to-diagnosis.

Or, if the diagnosis is intermittently (with time) performed from the stage of Fresh article, the occurrence of deterioration of the oxidation catalyst 600 can be captured. This is because the article which is determined in succession to be OK at the first may eventually be determined to be NG even though the timing of NG may be varied a little.

These things means that it is possible to diagnose the degree of deterioration of the oxidation catalyst 600 with practically satisfactory accuracy as compared to required diagnosis accuracy even in the manner that the threshold value is set for only the concentration Nl of an unburned hydrocarbon gas on a downstream side like the diagnosis by Passive OBD performed in the preferred embodiment.

<Example of Procedure of Active OBD>

Figure 13:
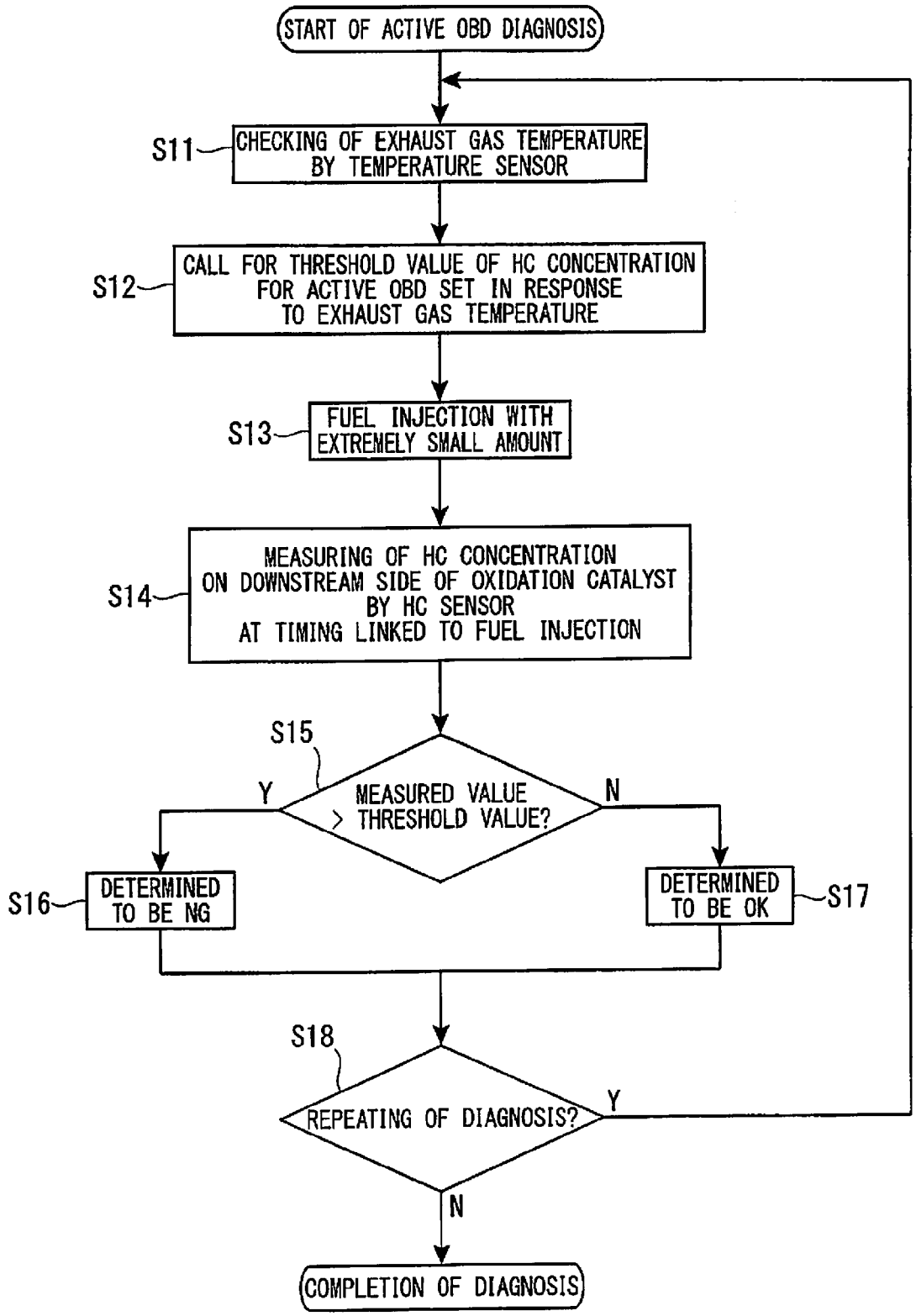
FIG. 13 is a view showing an example of a procedure of diagnosis by Active OBD.

FIG. 13 is a view showing an example of a procedure of diagnosis by Active OBD. The diagnosis by Active OBD starts with checking a temperature of the exhaust gas G (exhaust gas temperature) in the vicinity on an upstream side of the oxidation catalyst 600 by the temperature sensor 110, as with Passive OBD (step S11). More specifically, the electronic control device 200 acquires exhaust gas temperature detection signals sg12 sent from the temperature sensor 110 and thereby the exhaust gas temperature is identified. Such an exhaust gas temperature is regarded as a temperature of the oxidation catalyst 600 at the point in time.

Subsequently, the electronic control device 200 calls the threshold value of the concentration of an unburned hydrocarbon gas for Active OBD corresponding to the exhaust gas temperature from the threshold data for Active OBD previously stored in the storage portion (step S12). Also in the case of Active OBD, the threshold value is previously set in all temperatures within a possible temperature range of the oxidation catalyst 600 (approximately −40° C. to 1000° C.). Since there is not a particular restriction on how to give the threshold value, the threshold value may be given as a continuous function of a temperature of the oxidation catalyst 600 (exhaust gas temperature) or given as a fixed value for every temperature range.

Next, the electronic control device 200 sends a fuel-injection instructing signal sg1 to the fuel injection valve 301 to inject an extremely small amount of fuel for a short time (step S13). More specifically, such fuel injection is executed at the timing of post-injection in an engine cycle of the engine main body 300. Further, a unit injection amount is preferably 1 to 3 (mg/injection), an injection time is preferably 1 to 6 (sec), and a total injection amount is preferably 15 to 130 (mg). Particularly, the total injection amount is preferably 50 to 65 (mg). In such a case, it becomes possible to suitably perform the diagnosis by Active OBD while suppressing a fuel injection amount. In addition, the total injection amount is calculated from the following (Formula 2).

Total injection amount (mg)=Unit injection amount (mg/injection)×Injection time (sec)×engine speed (rpm)/120   (Formula 2)

Further, main examples of the total injection amount are shown in Table 1.

TABLE 1

| exhaust gas temperature | engine speed [rpm] | injection amount [mg/injection] | injection time [sec] | total fuel injection amount [mg] |
|---|---|---|---|---|
| 150° C. | 2000 | 1 | 6 | 100 |
|  |  | 1 | 3 | 17 |
|  |  | 3 | 1 | 50 |
| 200° C. | 2500 | 1 | 6 | 125 |
|  |  | 1 | 3 | 21 |
|  |  | 3 | 1 | 63 |

TABLE 1-continued

| exhaust gas temperature | engine speed [rpm] | injection amount [mg/injection] | injection time [sec] | total fuel injection amount [mg] |
|---|---|---|---|---|
| DPF regeneration mode (150° C.) | 2000 | 6 | 150 | 15000 |

As shown in Table 1, when the engine speed is 2000 rpm at which the exhaust gas temperature becomes about 150° C., and when the engine speed is 2500 rpm at which the exhaust gas temperature becomes about 200° C., a value of each total injection amount is in the range of 50 to 65 (mg) in the case of a unit injection amount of 3 (mg/injection) and an injection time of 1 (sec).

For comparison, Table 1 describes an example of fuel injection targeted for a DPF (diesel particulate filter), which is usually disposed in an exhaust pipe of an automobile, for regeneration of the DPF (DPF regeneration mode). As shown in Table 1, when such a DPF regeneration mode is performed in the situation in which the engine speed is 2000 rpm at which the exhaust gas temperature becomes about 150° C., injection of a unit injection amount of about 6 (mg/injection) is executed in an injection time of about 150 (sec). The total injection amount of such a case is about 15000 (mg). Since this value is several hundreds times larger than the total injection amount of the diagnosis by Active OBD in the preferred embodiment, a fuel consumption in Active OBD in the preferred embodiment can be said to be practically extremely small.

When such an extremely small amount of fuel injection is executed, injected fuel is vaporized inside of the engine main body 300 and discharged to the exhaust pipe 500 in a superimposed manner in addition to the exhaust gas G steadily discharged in association with an operation of the engine main body 300, and therefore an unburned hydrocarbon gas at a concentration higher than a steady condition is sent to the oxidation catalyst 600.

Then, at the timing linked with the fuel injection, more specifically, at the timing when the exhaust gas G containing a high concentration of an unburned hydrocarbon gas generated in association with the fuel injection reaches the oxidation catalyst 600, adsorption or oxidation of the unburned hydrocarbon gas in the exhaust gas G takes place inside the oxidation catalyst 600, and the rest thereof is discharged to the downstream side, as with Passive OBD, the concentration Nl of an unburned hydrocarbon gas on a downstream side of the oxidation catalyst 600 is measured in the HC sensor 100 (step S14).

Subsequent procedures are the same as in Passive OBD. That is, after measurement of the concentration Nl of an unburned hydrocarbon gas on a downstream side and call of the threshold value, the electronic control device 200 compares the measured value to the threshold value (step S15), and when the former is larger than the latter (YES in the step S15), the electronic control device 200 determines that deterioration occurs to a controversial extent (requiring replacement, etc.) in the oxidation catalyst 600 (to be NG) (step S16), and when the latter is larger than the former (NO in the step S15), the electronic control device 200 determines that such deterioration does not occur (to be OK) (step S17).

When diagnosis is repeated after the diagnosis regardless of whether determined to be NG or to be OK (YES in the step S18), this process is repeated again from checking an exhaust gas temperature by the temperature sensor 110. If not so, the diagnosis is ended as it is (NO in the step S18).

<Detail of Diagnosis by Active OBD>

Characteristic of the diagnosis by Active OBD according to the procedure shown in FIG. 13 will be described based on FIG. 14 to FIG. 18.

Figure 14:
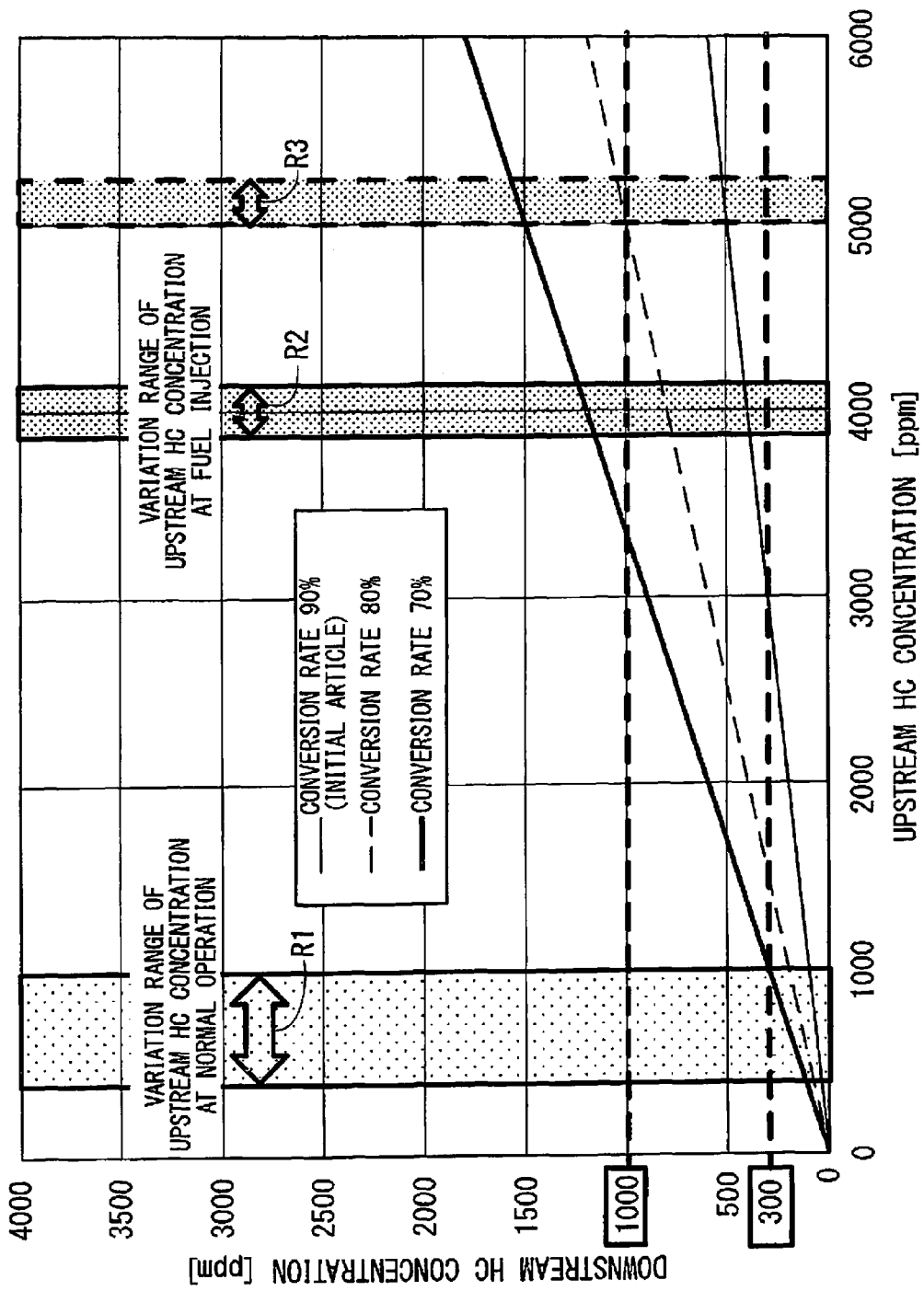
FIG. 14 is a view showing a relation between the concentration Nu of an unburned hydrocarbon gas on an upstream side and the concentration Nl of an unburned hydrocarbon gas on a downstream side in several conversion rates in the case where a temperature of an oxidation catalyst 600 is in an oxidation region.

First, FIG. 14 is a view showing a relation between the concentration Nu of an unburned hydrocarbon gas on an upstream side and the concentration Nl of an unburned hydrocarbon gas on a downstream side in several conversion rates in the case where a temperature of an oxidation catalyst 600 is in an oxidation region (hereinafter, the temperature of the oxidation catalyst 600 in this case is denoted by Tc). For example, Tc is 200° C. In FIG. 14, a relation between the concentration Nu of an unburned hydrocarbon gas on an upstream side and the concentration Nl of an unburned hydrocarbon gas on a downstream side is indicated by a thin solid line, a broken line and a thick solid line for the conversion rates of 90%, 80% and 70%, respectively. In addition, when the temperature is Tc, the oxidation catalyst having a conversion rate of 90% is assumed as a fresh article.

Figure 15:
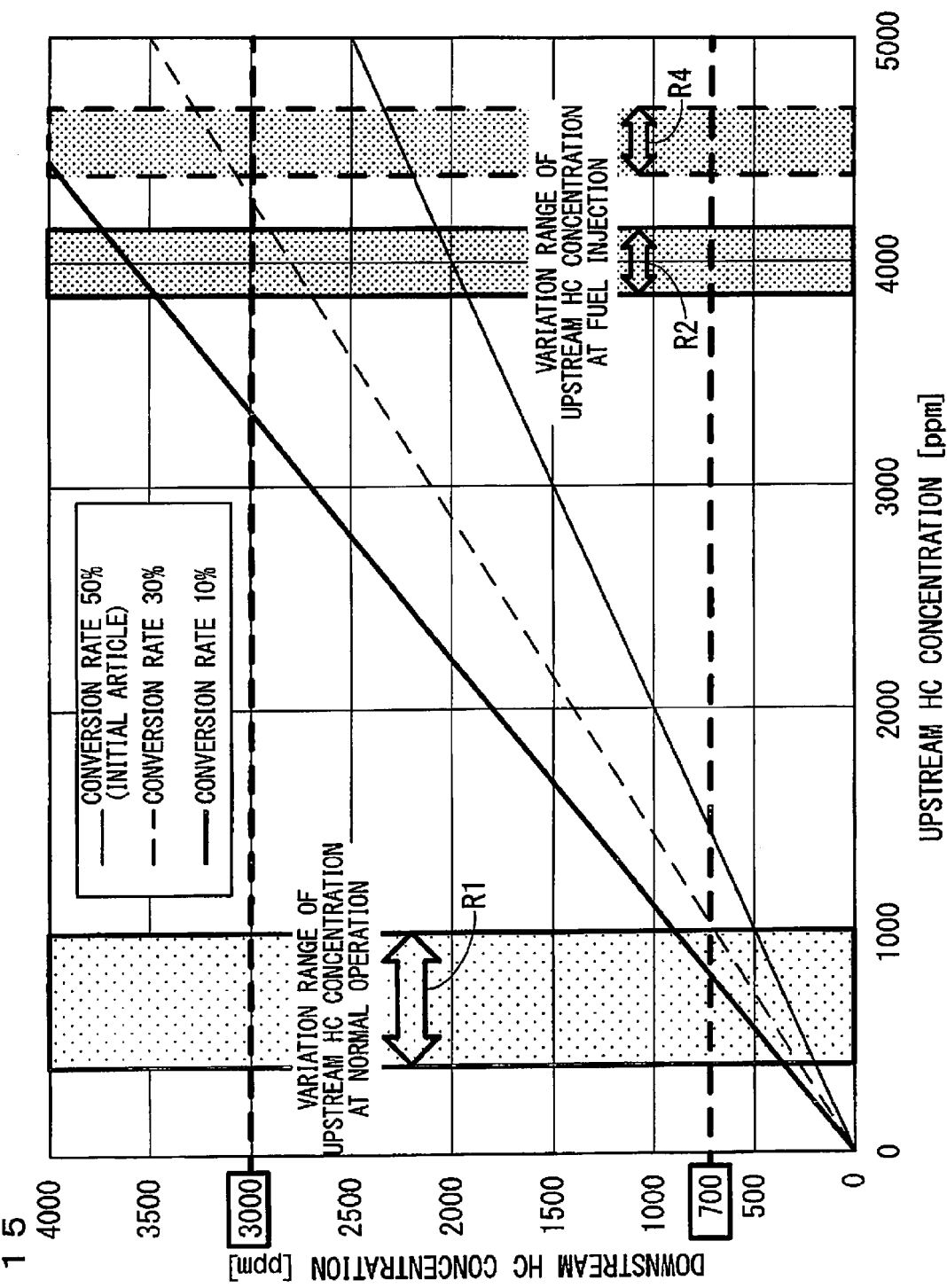
FIG. 15 is a view showing a relation between the concentration Nu of an unburned hydrocarbon gas on an upstream side and the concentration Nl of an unburned hydrocarbon gas on a downstream side in several conversion rates in the case where a temperature of an oxidation catalyst 600 is in an adsorption region.

On the other hand, FIG. 15 is a view showing a relation between the concentration Nu of an unburned hydrocarbon gas on an upstream side and the concentration Nl of an unburned hydrocarbon gas on a downstream side in several conversion rates in the case where a temperature of an oxidation catalyst 600 is in an adsorption region (hereinafter, the temperature of the oxidation catalyst 600 in this case is denoted by Td). For example, Td is 150° C. In FIG. 15, a relation between the concentration Nu of an unburned hydrocarbon gas on an upstream side and the concentration Nl of an unburned hydrocarbon gas on a downstream side is indicated by a thin solid line, a broken line and a thick solid line for the conversion rates of 50%, 30% and 10%, respectively. In addition, when the temperature is Td, the oxidation catalyst having a conversion rate of 50% is assumed as a fresh article.

In FIG. 14 and FIG. 15, a range of the axis is extended to a higher concentration side than those of FIG. 11 and FIG. 12; however, the conversion rate in the oxidation catalyst 600 absolutely obeys Formula 1, and therefore the concentration Nl of an unburned hydrocarbon gas on a downstream side has a linearity with respect to the concentration Nu of an unburned hydrocarbon gas on an upstream side even when the concentration Nu of an unburned hydrocarbon gas on an upstream side is increased. Thus, as shown in FIG. 14 and FIG. 15, magnitude of the conversion rate in the oxidation catalyst 600 is represented by magnitude of the slope of a straight line, as with FIG. 11 and FIG. 12.

The diagnosis by Active OBD is common to the diagnosis by Passive OBD in that the determination of NG or OK depends on whether the concentration Nl of an unburned hydrocarbon gas on a downstream side exceeds the threshold value previously set or not.

However, in the case of diagnosis by Active OBD, since the diagnosis is executed after injecting fuel, the concentration Nu of an unburned hydrocarbon gas on an upstream side during executing the diagnosis becomes higher than the variation range R1 of upstream HC concentration which is used in performing the diagnosis by Passive OBD.

Figure 16:
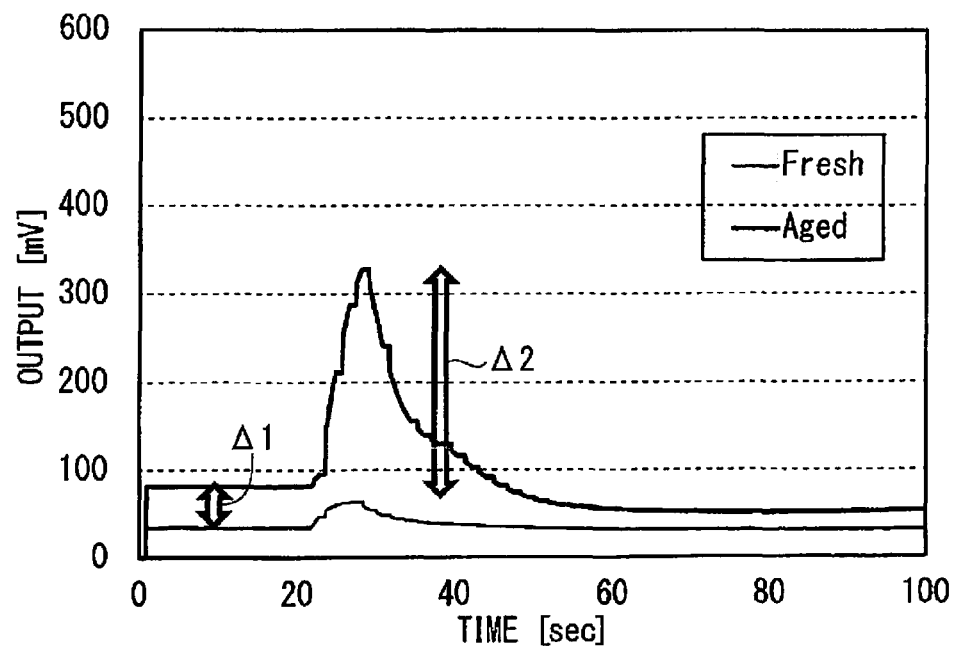
FIG. 16 is a view illustrating a change of a HC sensor output with respect to a time in performing diagnosis by Active OBD on a fresh article and an aged article as targets for the case where a temperature of the oxidation catalyst 600 is 200° C.
Figure 17:
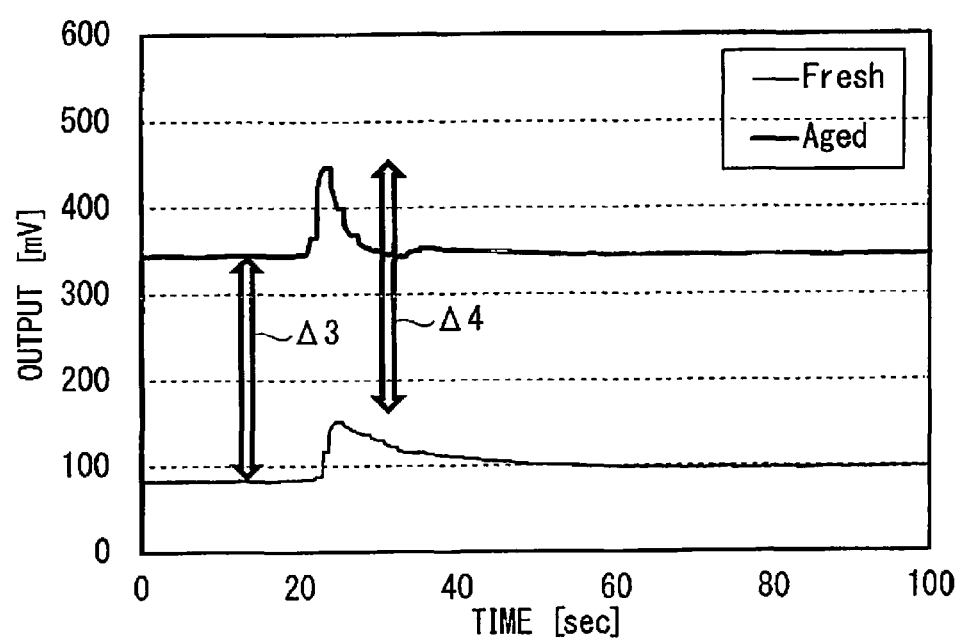
FIG. 17 is a view illustrating a change of a HC sensor output with respect to a time in performing diagnosis by Active OBD on a fresh article and an aged article as targets for the case where a temperature of the oxidation catalyst 600 is 150° C.

FIG. 16 and FIG. 17 are views each illustrating a change of an output value from the HC sensor 100 (HC sensor output) with respect to a time in performing diagnosis by Active OBD on a fresh article and an aged article as targets. FIG. 16 is a view in the case that a temperature of the oxidation catalyst 600 is 200° C. belonging to the oxidation region and FIG. 17 is a view in the case that a temperature of the oxidation catalyst 600 is 150° C. belonging to the adsorption region. With respect to a fuel injection condition, for the former, the unit injection amount was 1 (mg/injection) and the injection time was 6 (sec), and for the latter, the unit injection amount was 3 (mg/injection) and the injection time was 1 (sec).

The fuel injection is executed at the point in a horizontal axis where a time is about 20 seconds in any of FIG. 16 and FIG. 17, and then the HC sensor output increases several seconds later. The electronic control device 200 acquires the HC sensor output for the diagnosis by Active OBD at the timing when the output value increases. In addition, the vertical axis of FIG. 16 and FIG. 17 is "mV" being a unit of a voltage value which is an actual HC sensor output. In performing Active OBD, as described above, a concentration value is computed from the HC sensor output thus represented as the voltage value, and is compared with the threshold value.

Considering that the HC sensor output is largely fluctuated in executing Active OBD as shown in FIGS. 16 and 17, in FIG. 14 and FIG. 15, a possible concentration range of the concentration Nu of an unburned hydrocarbon gas on an upstream side in the case of such Active OBD is represented as a variation range R2 of upstream HC concentration during fuel injection. That is, in the diagnosis by Active OBD, when the concentration Nu of an unburned hydrocarbon gas on an upstream side lies within such a variation range R2 of upstream HC concentration, a measured value of the concentration Nl of an unburned hydrocarbon gas on a downstream side measured by the HC sensor 100 is compared to a predetermined threshold value.

In FIG. 14 and FIG. 15, a range of at least 3850 ppm and at most 4150 ppm is illustrated as the variation range R2 of upstream HC concentration during fuel injection. In addition, it is previously found empirically that with respect to the variation range R2 of upstream HC concentration during fuel injection, its central value and a differential value between the central value and upper/lower limit value can be identified according to the conditions of fuel injection. In the case of being illustrated in FIG. 14 and FIG. 15, a range of ±150 ppm centered at 4000 ppm is defined as the variation range R2 of upstream HC concentration during fuel injection.

As described above, in the case of the diagnosis by Active OBD, since the concentration range of the concentration Nu of an unburned hydrocarbon gas on an upstream side as a target is higher than that in the diagnosis by Passive OBD, the threshold value of the concentration Nl of an unburned hydrocarbon gas on a downstream side used in performing the diagnosis, is higher than that in the diagnosis by Passive OBD.

For example, FIG. 14 illustrates the case in which the threshold values in performing the diagnoses by Passive OBD and Active OBD in the case of the temperature Tc are set to 300 ppm and 1000 ppm, respectively. In this case, the oxidation catalyst 600 having the conversion rate of 70% is certainly determined to be NG in Active OBD since a measured value of the concentration Nl of an unburned hydrocarbon gas on a downstream side exceeds 1000 ppm in a range of the variation range R2 of upstream HC concentration.

Further, FIG. 15 illustrates the case in which the threshold values in performing the diagnoses by Passive OBD and Active OBD in the case of the temperature Td are set to 700 ppm and 3000 ppm, respectively. In this case, the oxidation catalyst 600 having the conversion rate of 10% is certainly determined to be NG in Active OBD since a measured value of the concentration Nl of an unburned hydrocarbon gas on a downstream side exceeds 3000 ppm in a range of the variation range R2 of upstream HC concentration.

To be safe, in the case of the temperature Tc shown in FIG. 14, the oxidation catalyst 600 having the conversion rate of 70%, which is certainly determined to be NG in Active OBD, is certainly determined to be OK when performing Passive OBD in which the threshold value is set to 300 ppm.

Similarly, in the case of the temperature Td shown in FIG. 15, the oxidation catalyst 600 having the conversion rate of 10%, which is certainly determined to be NG in Active OBD, can be determined to be OK or to be NG depending on an actual value of the concentration Nu of an unburned hydrocarbon gas on an upstream side when performing Passive OBD in which the threshold value is set to 700 ppm.

Considering that in the former, the catalyst is certainly determined to be NG in performing Passive OBD only when the conversion rate is less than 20%, and in the latter, no catalyst is certainly determined to be NG in Passive OBD, it can be said that in accordance with the Active OBD, the diagnosis of the degree of deterioration can be performed with higher accuracy (on the severe basis) than the Passive OBD. This is by virtue of the effect that, in Active OBD, since a value of the concentration Nu of an unburned hydrocarbon gas on an upstream side is large, a value of the concentration Nl of an unburned hydrocarbon gas on a downstream side inevitably becomes large, and therefore a difference in the conversion rate exerts a large influence upon a difference in measurement value in the HC sensor 100.

These means that the deterioration of the oxidation catalyst 600 can be diagnosed with accuracy by using the diagnosis by Passive OBD in conjunction with the diagnosis by Active OBD while setting the respective threshold values appropriately.

In addition, such a combined use is particularly effective when the temperature of the oxidation catalyst 600 is in the oxidation region. This is because, since the conversion rate of the oxidation catalyst 600 whose temperature is in the oxidation region is relatively high even if the catalyst 600 is an aged article as distinct from the case in which the temperature is in the adsorption region and particularly in the case of steady operation, a value of the concentration Nu of an unburned hydrocarbon gas on an upstream side is small, in many cases, a differential HC sensor output between the fresh article and the aged article in performing Passive OBD in the oxidation region (e.g., Δ1 in FIG. 16) tends to be small, but a differential HC sensor output between the fresh article and the aged article in performing Active OBD (e.g., Δ2 in FIG. 16) becomes large.

Incidentally, also when a temperature of the oxidation catalyst 600 is in the adsorption region, a differential HC sensor output between the fresh article and the aged article in performing Active OBD (e.g., Δ4 in FIG. 17) tends to be larger than a differential HC sensor output between the fresh article and the aged article in performing Passive OBD (e.g., Δ3 in FIG. 17), but a difference between the differential HC sensor output in Passive OBD and the differential HC sensor output in Active OBD is smaller than the difference in the oxidation region since an absolute value of Δ3 is relatively large in the first place.

Further, in Active OBD, there is also an effect obtained by varying the total injection amount in injecting fuel. For example, in the case of the temperature Tc shown in FIG. 14, a variation range R3 of upstream HC concentration is defined in a range of at least 5000 ppm and at most 5300 ppm which is higher in concentration than the variation range R2 of upstream HC concentration. When the threshold value is 1000 ppm as with the case of using the above-mentioned variation range R2 of upstream HC concentration as a target, the oxidation catalyst 600 having the conversion rate less than 80% which can be determined to be OK in the case of using the variation range R2 of upstream HC concentration as a target is certainly determined to be NG. This means that by using the variation range R2 of upstream HC concentration in conjunction with the variation range R3 of upstream HC concentration, it is possible to discriminate among the oxidation catalyst 600 with the conversion rate less than 70%, the oxidation catalyst 600 with the conversion rate of at least 70% and less than 80% and the oxidation catalyst 600 with the conversion rate of at least 80%.

Similarly, in the case of the temperature Td shown in FIG. 15, a variation range R4 of upstream HC concentration is defined in a range of at least 5350 ppm and at most 5650 ppm which is higher in concentration than the variation range R2 of upstream HC concentration. When the threshold value is 3000 ppm as with the case of using the above-mentioned variation range R2 of upstream HC concentration as a target, the oxidation catalyst 600 having the conversion rate less than 30% is also determined to be NG.

When performing multiple Active OBDs in which the total injection amount in injecting fuel is thus varied, this enables more detailed deterioration diagnosis which cannot be achieved by Passive OBD.

Figure 18:
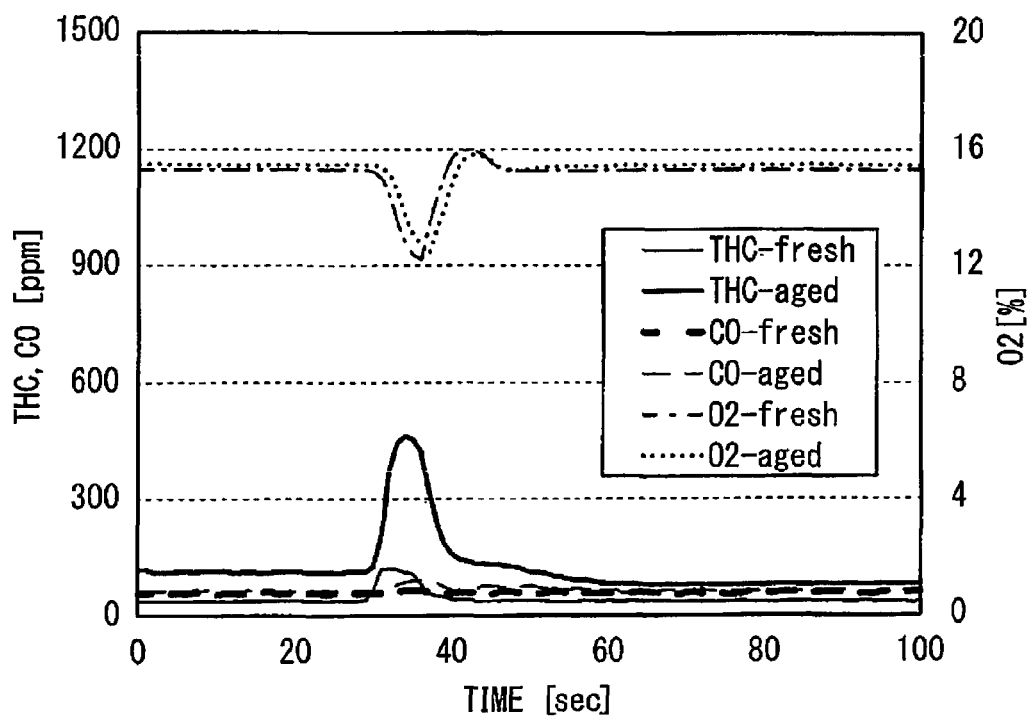
FIG. 18 is a view showing the results of analyzing components of an exhaust gas G by a gas analyzer in acquiring the HC sensor output shown in FIG. 16 on the fresh article and the aged article.

FIG. 18 is a view showing the results of analyses of components in the exhaust gases G by a gas analyzer in acquiring HC sensor outputs shown in FIG. 16 on the fresh article and the aged article.

While the HC sensor output value varies in FIG. 16 as a result of fuel injection performed for Active OBD, variation corresponding to fuel injection occurs also in FIG. 18. However, in FIG. 18, only a graph of THC being a typical hydrocarbon gas excluding CO of gas components contained in the unburned hydrocarbon gas in the aged article, largely varies in response to the fuel. It is assumed from such a result that the deterioration of oxidation of the aged article in the oxidation region is mainly due to the deterioration of oxidizing capability to the hydrocarbon. In addition, it is known that temperature dependency of catalytic ability of the oxidation catalyst 600 is different depending on a gas component as a target, and the result shown in FIG. 18 may confirm this. Such a result suggests that it is possible to determine the degree of deterioration of oxidizing capability to a specific gas component when the temperature of the oxidation catalyst 600 is intentionally varied in executing Active OBD in the oxidation region.

As described above, in accordance with the oxidation catalyst diagnosis system of the preferred embodiment, it is possible to diagnose, in real time and with excellent accuracy, the degree of deterioration of catalytic ability in an oxidation catalyst, which is disposed at a midpoint in the exhaust pipe from the engine main body being a diesel engine in an engine system, and oxidizes or adsorbs an unburned hydrocarbon gas in an exhaust gas. It is implemented without calculating the conversion rate being an index of the catalytic ability, based on the concentration of an unburned hydrocarbon gas at a downstream position close to the oxidation catalyst, which is directly measured by a hydrocarbon gas sensor disposed at the position in the exhaust pipe.

Particularly, according to Passive OBD in which the diagnosis is performed by directly using conditions where the engine main body is under an ordinary operation state, the deterioration of an oxidation catalyst can be diagnosed at any timing during the operation of the engine main body and without consuming fuel for diagnosis. Further, by repeating the diagnosis, the accuracy of diagnosis can be more enhanced.

Further, in accordance with Active OBD performing the diagnosis in a state in which the concentration of the unburned hydrocarbon gas flown into an oxidation catalyst is intentionally increased by injecting an extremely small amount of fuel, the deterioration of the oxidation catalyst can be diagnosed with higher accuracy than Passive OBD.

<Second Preferred Embodiment>

In the oxidation catalyst diagnosis system DS1 of the above-mentioned first preferred embodiment, the degree of deterioration of the oxidation catalyst 600 is diagnosed without actually calculating the conversion rate; however, in the preferred embodiment, an aspect in which the degree of deterioration of the oxidation catalyst 600 is diagnosed by actually calculating the conversion rate, will be described.

Figure 19:
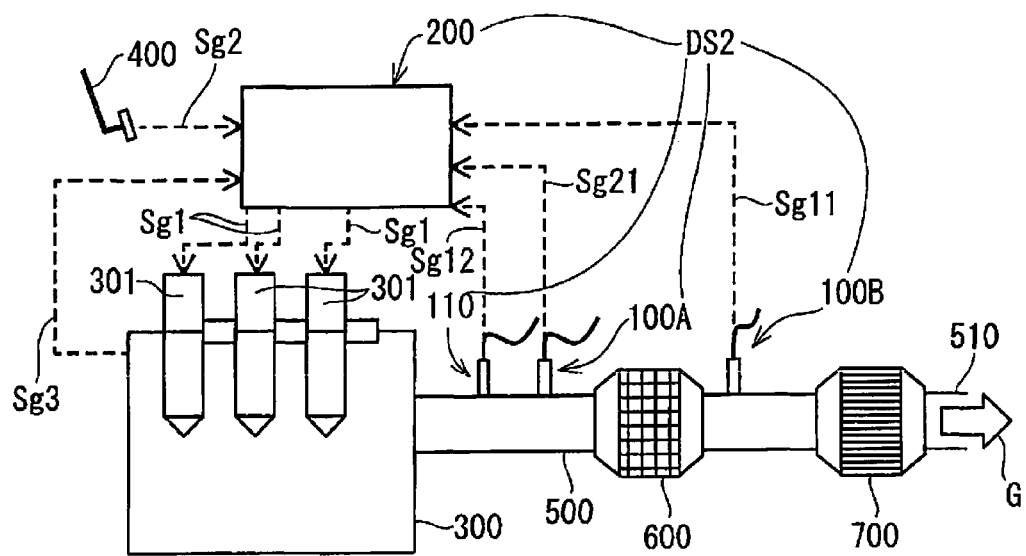
FIG. 19 is a view schematically showing a schematic configuration of an engine system 2000 configured to include an oxidation catalyst diagnosis system DS2 of a second preferred embodiment.

FIG. 19 is a view schematically showing a schematic configuration of an engine system 2000 configured to include an oxidation catalyst diagnosis system DS2 of second preferred embodiment of the present invention.

The oxidation catalyst diagnosis system DS2 of the preferred embodiment and the engine system 2000 have the same configurations as in the oxidation catalyst diagnosis system DS1 and the engine system 1000 of first preferred embodiment except that the HC sensor 100A and the HC sensor 100B are respectively disposed at both of an upstream and a downstream positions close to the oxidation catalyst 600 serving as a diagnosis target in the oxidation catalyst diagnosis system DS2 in the exhaust pipe 500. Thus, in the preferred embodiment, description about the detail of each constituent will be omitted. In the oxidation catalyst diagnosis system DS2, the HC sensor 100B disposed at a downstream positions close to the oxidation catalyst 600 sends a HC detection signal sg11 to the electronic control device 200 as with the HC sensor 100 of first preferred embodiment, and the HC sensor 100A disposed at a upstream positions close to the oxidation catalyst 600 also sends a HC detection signal sg21 to the electronic control device 200.

Figure 20:
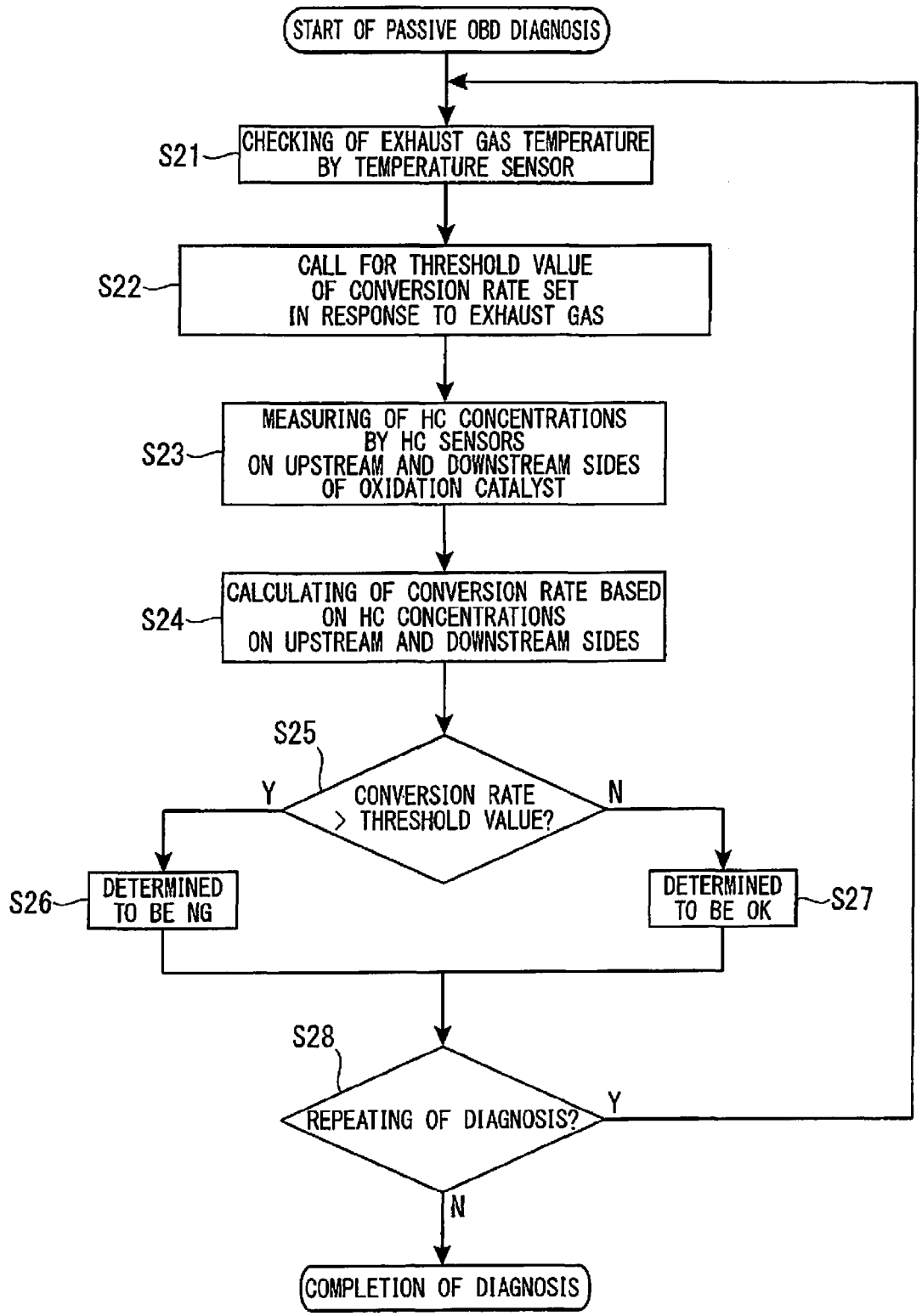
FIG. 20 is a view showing an example of a procedure of performing Passive OBD by an oxidation catalyst diagnosis system DS2.

FIG. 20 is a view showing an example of a procedure of performing Passive OBD by an oxidation catalyst diagnosis system DS2.

The diagnosis starts with checking a temperature of the exhaust gas G (exhaust gas temperature) in the vicinity on an upstream side of the oxidation catalyst 600 by the temperature sensor 110, as with Passive OBD in first preferred embodiment (step S21). More specifically, the electronic control device 200 acquires exhaust gas temperature detection signals sg12 sent from the temperature sensor 110 and thereby the exhaust gas temperature is identified. Such an exhaust gas temperature is regarded as a temperature of the oxidation catalyst 600 at the point in time.

Subsequently, the electronic control device 200 calls the threshold value of the conversion rate corresponding to the exhaust gas temperature from the threshold data for Passive OBD previously stored in the storage portion (step S22). In the preferred embodiment, the threshold value related to the conversion rate is previously set in all temperatures within a possible temperature range of the oxidation catalyst 600 (approximately −40° C. to 1000° C.). Further, in the preferred embodiment, the lower limit value of the allowable conversion rate range becomes the threshold value as it is. Since there is not a particular restriction on how to give the threshold value, the threshold value may be given as a continuous function of a temperature of the oxidation catalyst 600 (exhaust gas temperature) or given as a fixed value for every temperature range. In addition, the threshold value in such a case is set in view of having temperature dependency as shown in FIG. 3 in the catalytic ability of the oxidation catalyst 600. Usually, the threshold value in the oxidation region is set larger than the threshold value in the adsorption region.

Next, the concentration Nu of an unburned hydrocarbon gas on an upstream side and the concentration Nl of an unburned hydrocarbon gas on a downstream side of the oxidation catalyst 600 are measured by two HC sensors 100A and 100B (step S23). More specifically, measurement by a HC sensor 100A is performed immediately before the exhaust gas G whose temperature has been measured by the temperature sensor 110 reaches the oxidation catalyst 600, adsorption or oxidation of the unburned hydrocarbon gas in the exhaust gas G takes place in the oxidation catalyst 600, and then the rest of the unburned hydrocarbon gas is discharged to the downstream side, and at this timing, measurement by a HC sensor 100B is performed.

Figure 21:
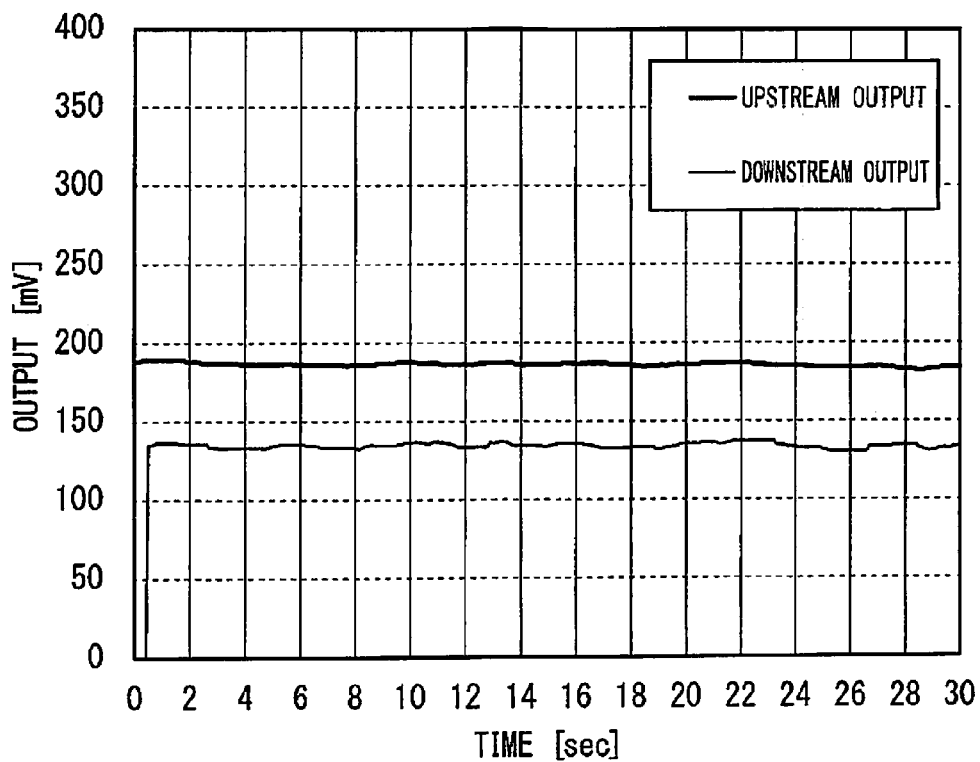
FIG. 21 is a view illustrating a HC sensor output in a fresh article in the case where a temperature of an oxidation catalyst 600 is 200° C.
Figure 22:
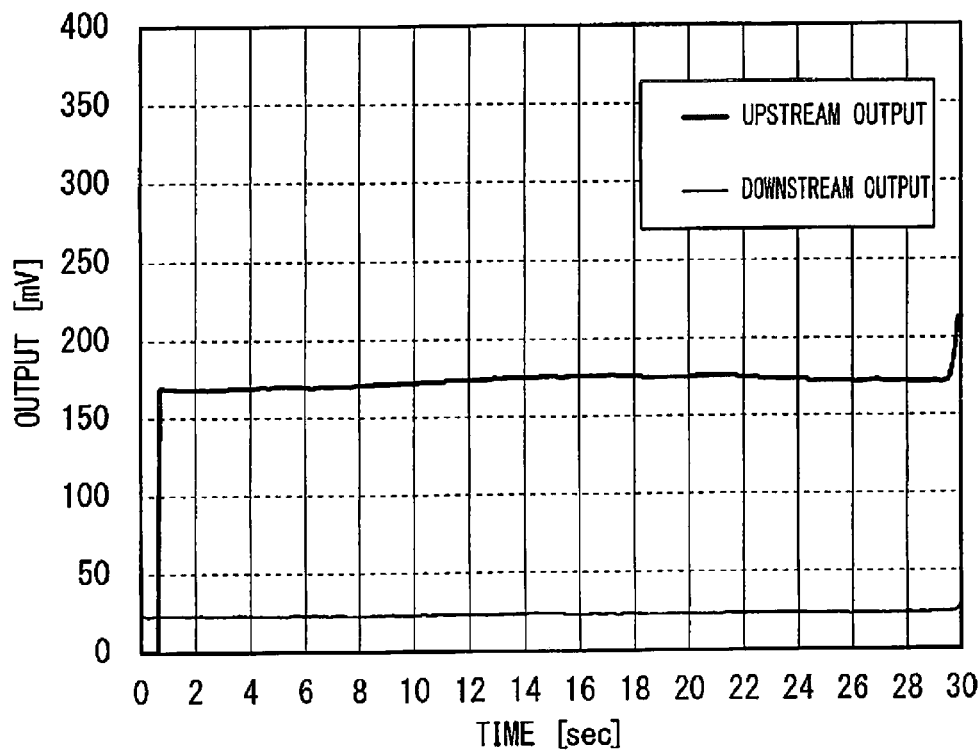
FIG. 22 is a view illustrating a HC sensor output in an aged article in the case where a temperature of an oxidation catalyst 600 is 200° C.

FIG. 21 and FIG. 22 are each a view illustrating a HC sensor output in a fresh article and an aged article respectively, in the case where a temperature of the oxidation catalyst 600 is 200° C. It is verified from FIG. 21 and FIG. 22 that the aged article is larger in a difference between an upstream output and a downstream output than the fresh article.

After acquiring measured values in two HC sensors 100A and 100B, the electronic control device 200 calculates a conversion rate based on Formula 1 using these measured values (step S24).

Then, the electronic control device 200 compares the calculated conversion rate to the threshold value (step S25), and when the former is larger than the latter (YES in the step S25), the electronic control device 200 determines that deterioration occurs to a controversial extent (requiring replacement, etc.) in the oxidation catalyst 600 (to be NG) (step S26), and when the latter is larger than the former (NO in the step S25), the electronic control device 200 determines that such deterioration does not occur (to be OK) (step S27).

When diagnosis is repeated after the diagnosis regardless of whether determined to be NG or to be OK (YES in the step S28), this process is repeated again from checking an exhaust gas temperature by the temperature sensor 110. If not so, the diagnosis is ended as it is (NO in the step S28).

As described above, in the case of Passive OBD in the preferred embodiment, since the conversion rate is actually calculated and the presence or absence of controversial deterioration is diagnosed, diagnosis having higher reliability than Passive OBD in first preferred embodiment can be performed. For example, in FIG. 20, one conversion rate is compared with one threshold value; however, it may be employed that the threshold value is set in multi-stage to diagnose the degree of deterioration of the oxidation catalyst 600.

Also in the oxidation catalyst diagnosis system DS2 of the preferred embodiment, the diagnosis by Active OBD can be performed in terms of the configuration as with the oxidation catalyst diagnosis system DS1 of first preferred embodiment, but it can be said that since the diagnosis by Passive OBD can be performed with accuracy, as described above, a merit of performing Active OBD associated with fuel injection although an extremely small amount, positively is smaller than that in first preferred embodiment.

As described above, in accordance with the oxidation catalyst diagnosis system of the preferred embodiment, since hydrocarbon gas sensors are disposed on both of the upstream and the downstream of the oxidation catalyst, it is possible to determine whether controversial deterioration occurs in an oxidation catalyst or not, based on the result of calculating the conversion rate of the oxidation catalyst based on measured values of both hydrocarbon gas sensors during an ordinary operation of the engine main body, and comparing the calculated value with a predetermined threshold value, and therefore it becomes possible to perform highly reliable diagnosis in Passive OBD not executing fuel injection.

While the invention has been shown and described in detail, the foregoing description is in all aspects illustrative and not restrictive. It is therefore understood that numerous modifications and variations can be devised without departing from the scope of the invention.

What is claimed is:

1. A catalyst deterioration diagnosis system for diagnosing a degree of deterioration of a catalyst, said catalyst being disposed in an exhaust path of an internal combustion engine and oxidizing or absorbing a target gas that includes at least one of a hydrocarbon gas and a carbon monoxide gas, the target gas being contained in an exhaust gas from said internal combustion engine, said system comprising:

a temperature sensor disposed upstream from said catalyst in said exhaust path and configured to measure a temperature of said exhaust gas containing said target gas upstream from said catalyst;

a first gas sensor disposed downstream from said catalyst in said exhaust path, said first gas sensor configured to detect said target gas downstream from said catalyst and output an output value in accordance with a concentration of said target gas;

an electronic control element configured to control said catalyst deterioration diagnosis system; and a storage part, wherein:

a threshold data describing threshold values to be used for said catalyst deterioration diagnosis according to a temperature of said catalyst is previously defined and stored in said storage part, said electronic control element is configured to diagnose the degree of deterioration in said catalyst, based on at least said output value from said first gas sensor, the temperature of said catalyst identified based on a measurement value in said temperature sensor, and said threshold value at the temperature of the catalyst which is described in said threshold data, when the concentration of said target gas on an upstream side of said catalyst is denoted by Nu and the concentration of said target gas on a downstream side of said catalyst is denoted by Nl, a conversion rate defined by the following calculation formula is used as an index representing a degree of oxidation or adsorption occurring in said catalyst, Conversion rate (%)=100×(Nu−Nl)/Nu, and said threshold value is defined based on said calculation formula, said internal combustion engine is capable of intentionally generating, in response to an injection instruction from said electronic control element, a diagnosis-gas atmosphere containing a target gas higher in concentration than said target gas during a steady-operation state of said internal combustion engine, an allowable conversion rate range being a range of said conversion rate allowable in said catalyst is previously defined according to a possible temperature of said catalyst and a possible concentration range of said target gas on an upstream side of said catalyst during deterioration diagnosis, a first value of said Nl with respect to said possible temperature of said catalyst, which is calculated by substituting, into said calculation formula, a lower limit value of said allowable conversion rate range at the temperature as said conversion rate, and an upper limit value of a range of an upstream gas concentration during a steady state being a possible concentration range of said target gas on an upstream side of said catalyst during a steady-operation state of said internal combustion as said Nu, is defined as a first said threshold value in said threshold data, and a second value of said Nl with respect to said possible temperature of said catalyst, which is calculated by substituting, into said calculation formula, a lower limit value of said allowable conversion rate range at the temperature as said conversion rate, and an upper limit value of a range of an upstream gas concentration during diagnosis being a possible concentration range of said diagnosis-gas atmosphere on an upstream side of said catalyst as said Nu, is defined as a second threshold value, and said electronic control element is configured to execute both a first diagnosis and a second diagnosis, and is further configured to selectively execute one of the first diagnosis and the second diagnosis, said first deterioration diagnosis being executable at a timing when said internal combustion engine is in a state of a steady operation, which diagnoses the degree of deterioration in said catalyst, based on said output from said first gas sensor, the temperature of said catalyst at the timing identified based on a measurement value in said temperature sensor, and said first threshold value at the temperature of the catalyst which is described in said threshold data, and said second deterioration diagnosis being executed after introducing said diagnosis-gas atmosphere into said catalyst, which diagnoses the degree of deterioration in said catalyst, based on said output value in said first gas sensor at the timing of discharging said diagnosis-gas from said catalyst, the temperature of said catalyst at the timing of introducing the said diagnosis-gas atmosphere identified based on a measurement value in said temperature sensor, and said second threshold value corresponding to the temperature of said catalyst at the timing.

2. The catalyst deterioration diagnosis system according to claim 1, wherein said first gas sensor is a mixed-potential hydrocarbon gas sensor comprising a sensing electrode whose catalyst activity is disabled with said sensing electrode being formed of a Pt—Au alloy.

3. The catalyst deterioration diagnosis system according to claim 1, further comprising a second gas sensor disposed upstream from said catalyst in said exhaust path, detecting said target gas at said upstream side and outputting an output value in accordance with a concentration of said target gas, wherein said electronic control element is configured to diagnose the degree of deterioration in said catalyst, based on said output values in said first and second gas sensors, the temperature of said catalyst identified based on a measurement value in said temperature sensor, and said threshold value at the temperature of the catalyst which is described in said threshold data.

4. The catalyst deterioration diagnosis system according to claim 3, the lower limit value of said allowable conversion rate range with respect to said possible temperature of said catalyst is defined as said threshold value in said threshold data, and said electronic control element is configured to determine that deterioration exceeding an acceptable level of a catalyst occurs in said catalyst when the conversion rate calculated based on said output values in said first and the second gas sensors is smaller than said threshold value.

5. The catalyst deterioration diagnosis system according to claim 4, wherein said first gas sensor is a mixed-potential hydrocarbon gas sensor comprising a sensing electrode whose catalyst activity is disabled with said sensing electrode being formed of a Pt—Au alloy.

6. The catalyst deterioration diagnosis system according to claim 3, wherein said first and second gas sensors are each a mixed-potential hydrocarbon gas sensor comprising a sensing electrode whose catalyst activity is disabled with said sensing electrode being formed of Pt—Au alloy.

7. A method for diagnosing a degree of deterioration of a catalyst, said catalyst being disposed in an exhaust path of an internal combustion engine and oxidizing or absorbing a target gas that includes at least one of a hydrocarbon gas and a carbon monoxide gas, the target gas being contained in an exhaust gas from said internal combustion engine, said method performed by a catalyst deterioration diagnosis system comprising, a temperature sensor disposed upstream from said catalyst in said exhaust path and configured to measure a temperature of said exhaust gas containing said target gas upstream from said catalyst;

a first gas sensor disposed downstream from said catalyst in said exhaust path, said first gas sensor configured to detect said target gas downstream from said catalyst and output an output value in accordance with a concentration of said target gas;

an electronic control element configured to control said catalyst deterioration diagnosis system; and a storage part, and said method comprising the steps of:

a) storing, in said storage part, threshold data previously defined, said threshold data describing threshold values to be used for said catalyst deterioration diagnosis according to a temperature of said catalyst;

b) measuring a temperature of said exhaust gas containing said target gas by said temperature sensor upstream from said catalyst;

c) detecting said target gas by said first gas sensor downstream from said catalyst, and outputting said output value in accordance with a concentration of said target gas; and d) diagnosing the degree of deterioration in said catalyst in said electronic control element, based on at least said output value in said first gas sensor, the temperature of said catalyst identified based on a measurement value in said temperature sensor, and said threshold value at the temperature of the catalyst, wherein the concentration of said target gas on an upstream side of said catalyst is denoted by Nu and the concentration of said target gas on a downstream side of said catalyst is denoted by Nl, a conversion rate defined by the following calculation formula is used as an index representing a degree of oxidation or adsorption occurring in said catalyst, Conversion rate (%)=100×(Nu−Nl)/Nu, and said threshold value is defined based on said calculation formula, said internal combustion engine is capable of intentionally generating, in response to an injection instruction from said electronic control element, a diagnosis-gas atmosphere containing a target gas higher in concentration than said target gas during a steady-operation state of said internal combustion engine, an allowable conversion rate range being a range of said conversion rate allowable in said catalyst is previously defined according to a possible temperature of said catalyst and a possible concentration range of said target gas on an upstream side of said catalyst during deterioration diagnosis, a first value of said Nl with respect to said possible temperature of said catalyst, which is calculated by substituting, into said calculation formula, a lower limit value of said allowable conversion rate range at the temperature as said conversion rate, and an upper limit value of a range of an upstream gas concentration during a steady state being a possible concentration range of said target gas on an upstream side of said catalyst during a steady-operation state of said internal combustion as said Nu, is defined as a first said threshold value in said threshold data, and a second value of said Nl with respect to said possible temperature of said catalyst, which is calculated by substituting, into said calculation formula, a lower limit value of said allowable conversion rate range at the temperature as said conversion rate, and an upper limit value of a range of an upstream gas concentration during diagnosis being a possible concentration range of said diagnosis-gas atmosphere on an upstream side of said catalyst as said Nu, is defined as a second threshold value, and wherein said electronic control element is configured to execute both a first diagnosis and a second diagnosis, in step d) one or both of first and second deterioration diagnoses are selectively executed, said first deterioration diagnosis being executable at a timing when said internal combustion engine is in a state of a steady operation, which diagnoses the degree of deterioration in said catalyst, based on said output from said first gas sensor, the temperature of said catalyst at the timing identified based on a measurement value in said temperature sensor, and said first threshold value at the temperature of the catalyst which is described in said threshold data, and said second deterioration diagnosis being executed after introducing said diagnosis-gas atmosphere into said catalyst, which diagnoses the degree of deterioration in said catalyst, based on said output value in said first gas sensor at the timing of discharging said diagnosis-gas from said catalyst, the temperature of said catalyst at the timing of introducing the said diagnosis-gas atmosphere identified based on a measurement value in said temperature sensor, and said second threshold value corresponding to the temperature of said catalyst at the timing.

8. The catalyst deterioration diagnosis method according to claim 7 further comprising the step of:

e) detecting said target gas by a second gas sensor at the upstream from said catalyst in said exhaust path, and outputting an output value in accordance with a concentration of said target gas;

wherein the degree of deterioration in said catalyst is diagnosed based on said output values in said first and second gas sensors, the temperature of said catalyst identified based on a measurement value in said temperature sensor, and said threshold value at the temperature of the catalyst.

9. The catalyst deterioration diagnosis method according to claim 8, the lower limit value of said allowable conversion rate range with respect to the possible temperature of said catalyst is defined as said threshold value in said threshold data, and in said step d), deterioration exceeding an acceptable level of a catalyst is determined not to occur in said catalyst when the conversion rate calculated based on said output values in said first and second gas sensors is said threshold value or more, and deterioration exceeding the acceptable level of a catalyst is determined to occur in said catalyst when the conversion rate calculated based on said output values in said first and the second gas sensors is smaller than said threshold value.

10. The catalyst deterioration diagnosis method according to claim 8, wherein a mixed-potential hydrocarbon gas sensor is used for detection of a target gas, said mixed-potential hydrocarbon gas sensor comprising a sensing electrode whose catalyst activity is disabled with said sensing electrode being formed of a Pt—Au alloy.

11. The catalyst deterioration diagnosis method according to claim 7, wherein a mixed-potential hydrocarbon gas sensor is used for detection of said target gas, said mixed-potential hydrocarbon gas sensor comprising a sensing electrode whose catalyst activity is disabled with said sensing electrode being formed of a Pt—Au alloy.

* * * * *